US007668119B2

(12) United States Patent  (10) Patent No.: US 7,668,119 B2
Thubert et al.  (45) Date of Patent: Feb. 23, 2010

(54) AD HOC NETWORK FORMATION AND MANAGEMENT BASED ON AGGREGATION OF AD HOC NODES ACCORDING TO AN AGGREGATION HIERARCHY

(75) Inventors: Pascal Thubert, La Colle sur Loup (FR); Thomas Berry, Holly Springs, NC (US); Vincent Jean Ribiere, Biot (FR); Alvaro Enrique Retana, Raleigh, NC (US); Russell Ivan White, Holly Springs, NC (US)

(73) Assignee: Cisco Technology, Inc., San Jose, CA (US)

( * ) Notice: Subject to any disclaimer, the term of this patent is extended or adjusted under 35 U.S.C. 154(b) by 268 days.

(21) Appl. No.: 11/984,049

(22) Filed: Nov. 13, 2007

(65) Prior Publication Data

US 2008/0212494 A1    Sep. 4, 2008

Related U.S. Application Data

(63) Continuation of application No. 11/324,270, filed on Jan. 4, 2006, now abandoned.

(51) Int. Cl.
*H04L 12/28*    (2006.01)
(52) U.S. Cl. .................. 370/256; 370/255; 370/338; 370/349; 370/352; 370/392; 370/395.31; 370/407; 370/408; 455/518; 455/41.2; 379/114.13; 709/242
(58) Field of Classification Search .............. 370/256, 370/238, 242, 254, 255, 310, 328, 338, 349, 370/352, 389, 392, 395.31, 400, 401, 407, 370/408; 455/517, 518, 522, 41.2; 379/114.13; 709/242
See application file for complete search history.

(56) References Cited

U.S. PATENT DOCUMENTS 7,177,295 B1    2/2007    Sholander et al.

(Continued)

FOREIGN PATENT DOCUMENTS

EP    1 324 532 A2    7/2003

(Continued)

OTHER PUBLICATIONS

Baker, "An outsider's view of MANET", Network Working Group, <draft-baker-manet-review-01>, Mar. 17, 2002.

(Continued)

*Primary Examiner*—Matthew D Anderson
*Assistant Examiner*—Shaima Q Aminzay
(74) *Attorney, Agent, or Firm*—Leon R. Turkevich

(57) ABSTRACT

Each mobile ad hoc node has an assigned hierarchy position within an identified tree-based aggregation group. Each ad hoc node is configured for selectively attaching to one of a plurality of available ad hoc nodes based on identifying a best match, for the assigned hierarchy position within the identified aggregation group, from among identifiable hierarchy positions of identifiable aggregation groups. Each ad hoc node also is configured for selectively attaching to any available ad hoc node based on a determined absence of any available ad hoc node advertising the identified aggregation group of the ad hoc node, or an aggregation group containing the identified aggregation group. Hence, a root node of an aggregation group can filter group-specific routing information from packets destined toward a network clusterhead, resulting in a scalable routing protocol that is not adversely affected by added nodes.

47 Claims, 10 Drawing Sheets

U.S. PATENT DOCUMENTS

| | | |
|---|---|---|
| 7,184,421 B1 | 2/2007 | Liu et al. |
| 2002/0062388 A1* | 5/2002 | Ogier et al. ............... 709/238 |
| 2003/0161287 A1 | 8/2003 | Venkitaraman et al. |
| 2004/0032852 A1 | 2/2004 | Thubert et al. |
| 2004/0081152 A1 | 4/2004 | Thubert et al. |
| 2004/0117339 A1 | 6/2004 | Thubert et al. |
| 2005/0083974 A1 | 4/2005 | Mayer et al. |
| 2005/0099971 A1 | 5/2005 | Droms et al. |
| 2005/0185632 A1 | 8/2005 | Draves et al. |
| 2005/0265259 A1 | 12/2005 | Thubert et al. |
| 2006/0146730 A1 | 7/2006 | Zeng et al. |
| 2006/0227724 A1 | 10/2006 | Thubert et al. |

OTHER PUBLICATIONS

Jiang et al., "Cluster Based Routing Protocol (CBRP) Functional Specification", Internet Draft, <draft-ietf-manet-cbrp-spec-00.txt>, Aug. 1998.

Johnson et al., "Mobility Support in IPv6", Network Working Group, Request for Comments: 3775, Jun. 2004.

Devarapalli et al., "Network Mobility (NEMO) Basic Support Protocol", Network Working Group, Request for Comments: 3963, Jan. 2005.

* cited by examiner ent invention relates to protocols for creation of an
AD HOC NETWORK FORMATION AND MANAGEMENT BASED ON AGGREGATION OF AD HOC NODES ACCORDING TO AN AGGREGATION HIERARCHY This application is a continuation of commonly-assigned, application Ser. No. 11/324,270, filed Jan. 4, 2006 now abandoned.

BACKGROUND OF THE INVENTION

1. Field of the Invention

The present invention relates to protocols for creation of an ad hoc mobile network by multiple ad hoc mobile routers. The present invention also relates to management of the ad hoc mobile network by the multiple ad hoc mobile routers by distributing routing information and network traffic in an efficient manner.

2. Description of the Related Art

Mobile computing has evolved to an extent that it is no longer limited to a mobile computing model (e.g., "Mobile IP") that relies on a fixed wide area network infrastructure such as the Internet to provide connectivity between a mobile node and a correspondent node; rather, an ad hoc networking model has been pursued that enables an isolated group of mobile nodes to independently establish communications among each other (e.g., a "mesh") and establish optimized routing paths among each other.

In particular, the aforementioned Mobile IP model has been developed based on numerous proposals by Internet Engineering Task Force (IETF) groups: these IETF proposals (e.g., Requests for Comments (RFCs), Internet Drafts, etc.) have addressed improved mobility support of Internet Protocol (IP) based mobile devices (e.g., laptops, IP phones, personal digital assistants, etc.) in an effort to provide continuous Internet Protocol (IP) based connectivity for IP devices to a fixed wide area network such as the Internet. These IETF proposals have described the Mobile IP model as relying on an IP node (IPv4 or IPv6) having a home address that is registered with a home agent at its home network: the home agent and home network are assumed to be fixed within the Internet architecture, enabling the home address to be globally reachable by any Internet node via the fixed home network and home agent.

If the IP node in the Mobile IP model is roaming away from its home network and establishes communications in a visited IP network, the visited IP network assigns a care-of address to the IP node: the care-of address is globally reachable in the Internet via a fixed gateway at the edge of the visited IP network (also referred to herein as a "visited gateway"). Since the visited gateway provides a fixed presence on the Internet for the visited IP network, registration by an IP node with its home agent (by specifying that the roaming IP node is reachable via the care-of address assigned by the visited IP network) enables the home agent to use the care-of address to forward packets destined for the home address to the IP node, for example via a tunnel between the home agent and the visited gateway. Alternately, the tunnel can be extended to the router nearest the roaming IP node based on the roaming IP node employing a reverse routing header as described in U.S. Patent Publication No. US 2004/0117339, published Jun. 17, 2004, the disclosure of which is incorporated in its entirety herein by reference.

Hence, an IPv4 or IPv6 node (host or router) in the Mobile IP model can seamlessly "roam" among different mobile IP networks, based on relying upon the home agent and visited gateway having a fixed presence on the Internet. Since the Internet utilizes a hierarchy of aggregate network addresses that enables scalability, the reliance of a fixed presence for the home agent and the visited gateway in the Internet enables similar optimization techniques to be applied in mobile IP networks relying on a fixed gateway, for example aggregation of network addresses and network prefixes based on a hierarchal network model. See, for example, U.S. Patent Publication No. US 2005/0099971, published May 12, 2005, the disclosure of which is incorporated in its entirety herein by reference.

In contrast, the ad hoc networking model assumes no previous existing network topology: Internet connectivity is neither assumed nor precluded, and every network node is assumed to be mobile. Consequently, the ad hoc networking model assumes no more that a group of mobile nodes (hosts and routers) may arbitrarily connect to each other via available link layer ("Layer 2") connections, resulting in a mesh network. Hence, the ad hoc networking model addresses routing protocols that enable the ad hoc network nodes to create optimized network layer paths to each other, using for example a directed acyclic graph-based path or a tree topology-based path.

The IETF has a Mobile Ad-hoc Networks (MANET) Working Group that is working to implement this ad hoc networking model by developing standardized MANET routing specification(s) for adoption by the IETF. According to the MANET Working Group, the "mobile ad hoc network" (MANET) is an autonomous system of mobile routers (and associated hosts) connected by wireless links—the union of which form an arbitrary graph. The routers and hosts are free to move randomly and organize themselves arbitrarily; thus, the network's wireless topology may change rapidly and unpredictably. Such a network may operate in a standalone fashion, or may be connected to the larger Internet.

The MANET system is particularly suited to low-power radio networks that may exhibit an unstable topology, where wireless propagation characteristics and signal quality between a wireless transmission source and a receiver can be difficult to model and quantify. Since there is no fixed network infrastructure in a MANET, the device address is tied to the device, not a topological location. As described in an Internet Draft by Baker, entitled "An Outsider's View of MANET" (Mar. 17, 2002), the fundamental behavior of a MANET is that a mobile router in a MANET retains a unique address prefix that may be distinct from the address prefixes of neighboring mobile routers; in other words, neighboring mobile routers in a MANET may have distinct address prefixes. Consequently, if a mobile router in a MANET moves, the movement causes a change in the routing infrastructure that requires recalculation of routes in accordance with the new topology. Hence, efficient routing algorithms are needed to ensure rapid convergence of the new topology based on the recalculated routes. One exemplary routing protocol is Open Shortest Path First (OSPF) (as specified by the IETF Request for Comments (RFC) 2178).

Communications between mobile routers of an ad hoc network can be optimized based on the mobile routes organizing into a tree-based topology. For example, U.S. Patent Publication No. US 2004/0032852, published Feb. 19, 2004, entitled "Arrangement for Router Attachments Between Roaming Mobile Routers in a Mobile Network", the disclosure of which is incorporated in its entirety herein by reference, describes a technique for each mobile router of an mobile ad hoc network to independently select whether to attach to a candidate attachment router, based on tree information options advertised by the candidate attachment router and selection criteria employed by the mobile router. The independent selection by each router of whether to attach to another router enables the routers to dynamically establish a tree-based network topology model, where each router may continually determine whether an alternate attachment point within the tree is preferred.

Once a tree-based topology has been established within the ad hoc network, routing information can be distributed in an efficient manner. For example, U.S. Patent Publication No. US 2005/0265259, published Dec. 1, 2005 entitled "Arrangement for Providing Network Prefix Information from Attached Mobile Routers to a Clusterhead in a Tree-Based Ad Hoc Mobile Network", the disclosure of which is incorporated in its entirety herein by reference, describes optimized transfer of routing information between mobile routers in an ad hoc mobile network having a tree topology, wherein the ad hoc network includes a single clusterhead and attached mobile routers. Each attached mobile router has a default egress interface configured for sending messages toward the clusterhead, and ingress interfaces configured for receiving messages from attached network nodes that are away from the clusterhead. A neighbor advertisement message received from an ingress interface away from a clusterhead is used by the attached mobile router to identify specified network prefixes that are reachable via the source of the neighbor advertisement message. The attached mobile router outputs on its default upstream interface a second neighbor advertisement message that specifies the network prefix used by the attached mobile router, and the specified network prefixes from the neighbor advertisement message received on the ingress interface. Hence, the propagation of neighbor advertisement messages toward the clusterhead establishes connectivity with minimal routing overhead.

The nature of ad hoc networking also enables individual tree-based ad hoc networks to form a larger ad hoc network based on neighboring border routers from the respective ad hoc networks communicating amongst each other, forming a bridge between the tree-based ad hoc networks. An example of individual tree-based ad hoc networks forming a larger ad hoc network using a bridge between respective border routers is described in U.S. Patent Publication No. US 2004/0081152, entitled "Arrangement for Router Attachments between Roaming Mobile Routers in a Clustered Network", published Apr. 29, 2004, the disclosure of which is incorporated in its entirety herein by reference. Hence, ad hoc networks can join together to form even larger ad hoc networks.

As described above, a fundamental problem with the ad hoc networking model is that movement of a mobile router in the ad hoc network requires recalculation of routes for the new topology. However, the formation of a larger ad hoc network creates a greater probability that an individual mobile router will move, requiring route recalculation for each movement by a mobile router. Further, the formation of the larger ad hoc network requires recalculation of routes among a larger number of mobile routers, resulting in a longer convergence time. Consequently, the size of the ad hoc network is limited by the frequency of route recalculation relative to the convergence time, because if the frequency of route recalculation exceeds the convergence time, the ad hoc network will lose connectivity between the ad hoc mobile nodes due to their failure to converge before another ad hoc mobile node moves.

Even if a large ad hoc network manages to converge before another ad hoc mobile node moves, communications efficiency within the ad hoc network suffers dramatically due to substantially increased overhead in packets utilizing routing headers, since a separate routing header is required for each hop in the path from a source node to a destination node.

Consequently, a fundamental problem with a large ad hoc network is the associated increase in routing information that must be distributed to maintain network integrity (i.e., convergence of network routes) and to permit routing of packets.

SUMMARY OF THE INVENTION

There is a need for an arrangement that enables formation of large ad hoc networks without adversely affecting network convergence ability or communications efficiency. In particular, there is a need for an arrangement that minimizes the need for distributing unnecessary routing information throughout the network.

There also is a need for an arrangement that enables ad hoc network nodes to selectively filter routing information to prevent unnecessary routing information from being needlessly distributed throughout the ad hoc network.

There also is a need for an arrangement that enables ad hoc network nodes to move within an ad hoc network, without the necessity of requiring recalculation of routes in portions of the ad hoc network that are not affected by the movement.

There also is a need for an arrangement that enables ad hoc network nodes to utilize scalable routing protocols that do not adversely limit the capacity or size of the ad hoc network.

There also is a need for an arrangement that enables ad hoc network nodes to organize according to a prescribed hierarchy, enabling the use of aggregation techniques to selectively distribute routing information and compress routing headers in transmitted packets, without limiting any ad hoc network node from moving about the ad hoc network.

These and other needs are attained by the present invention, where each mobile ad hoc node has an assigned hierarchy position within an identified tree-based aggregation group. Each ad hoc node is configured for selectively attaching to one of a plurality of available ad hoc nodes based on identifying a best match, for the assigned hierarchy position within the identified aggregation group, from among identifiable hierarchy positions of identifiable aggregation groups. Each ad hoc node also is configured for selectively attaching to any available ad hoc node based on a determined absence of any available ad hoc node advertising the identified aggregation group of the ad hoc node, or an aggregation group containing the identified aggregation group.

Hence, the mobile ad hoc nodes are able to establish a tree-based ad hoc mobile network having a network clusterhead and aggregation groups, each aggregation group having a corresponding aggregation hierarchy and group identity. Each aggregation group has within its hierarchy a single root node (i.e., group clusterhead), and each aggregation group is identified within its aggregation hierarchy as either a dominant group or a subordinate group: the root node of a subordinate group establishes a network connection on behalf of the subordinate group by attaching to another mobile ad hoc node within a dominant group having a shared identity; the root node of a dominant aggregation group establishes network connections with root nodes of other dominant aggregation groups having respective distinct group identities.

Since each root node serves as the group clusterhead for the corresponding aggregation hierarchy, the root node is configured for outputting filtered routing information toward the network clusterhead by removing group-specific routing information received from within the corresponding aggregation group. Hence, the use of filtered routing information ensures that the ad hoc mobile network utilizes a scalable routing protocol that is not adversely affected by added nodes.

One aspect of the present invention provides a method in a mobile ad hoc router. The method includes receiving router advertisement messages, each including a source address field and a tree information option field. The source address field identifies a corresponding available mobile ad hoc router having sent the corresponding router advertisement message, and the tree information option field has attributes describing a corresponding position of the corresponding available mobile ad hoc router within a tree-structured network topology. The attributes include (1) an identifiable aggregation group and (2) an identifiable hierarchy position of the corresponding available mobile ad hoc router within the identifiable aggregation group. The identifiable aggregation group identifies a corresponding aggregation of attached mobile ad hoc routers forming a subset of the tree-structured network topology, the aggregation including the corresponding available mobile ad hoc router. The method also includes selectively attaching to one of the available mobile ad hoc routers based on determining the one available mobile ad hoc router provides a best match, relative to the mobile ad hoc router having an assigned hierarchy position within an identified aggregation group, from among the identifiable hierarchy positions of identifiable aggregation groups.

The selective attachment of the mobile ad hoc router based on available best match for the assigned hierarchy position within the identified aggregation group enables the mobile ad hoc router to independently organize with other mobile ad hoc routers, enabling the independent formation of a structured hierarchy within a tree-based ad hoc mobile network. In addition, the mobile ad hoc router is not precluded from attaching to other mobile ad hoc routers in the absence of any attachments within its identifiable aggregation groups; hence, the mobile ad hoc router still can attach to mobile ad hoc routers of other distinct aggregation groups, as needed.

Another aspect of the invention provides a mobile ad hoc network comprising a plurality of mobile ad hoc routers. Each mobile ad hoc router includes an assigned hierarchy position within an identified aggregation group, a network interface, and an attachment resource. The network interface configured is for sending and receiving router advertisement messages: each router advertisement message specifies a source address field identifying a corresponding available mobile ad hoc router, and a tree information option field. The tree information option field has attributes describing an identifiable aggregation group for the corresponding available mobile ad hoc router within a corresponding subset of a tree-structured network topology of the mobile ad hoc network, and an identifiable hierarchy position of the corresponding available mobile ad hoc router within the identifiable aggregation group. The attachment resource is configured for selectively attaching to one of the available mobile ad hoc routers having been identified as providing a best match, for the assigned hierarchy position within the identified aggregation group, among the identifiable hierarchy positions of identifiable aggregation groups. Hence, the mobile ad hoc routers form the tree-structured network topology as a tree of aggregation groups, each aggregation group including a single corresponding root, each mobile ad hoc router operating as a root configured for outputting filtered routing information toward one of mobile ad hoc routers identified as a network clusterhead.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
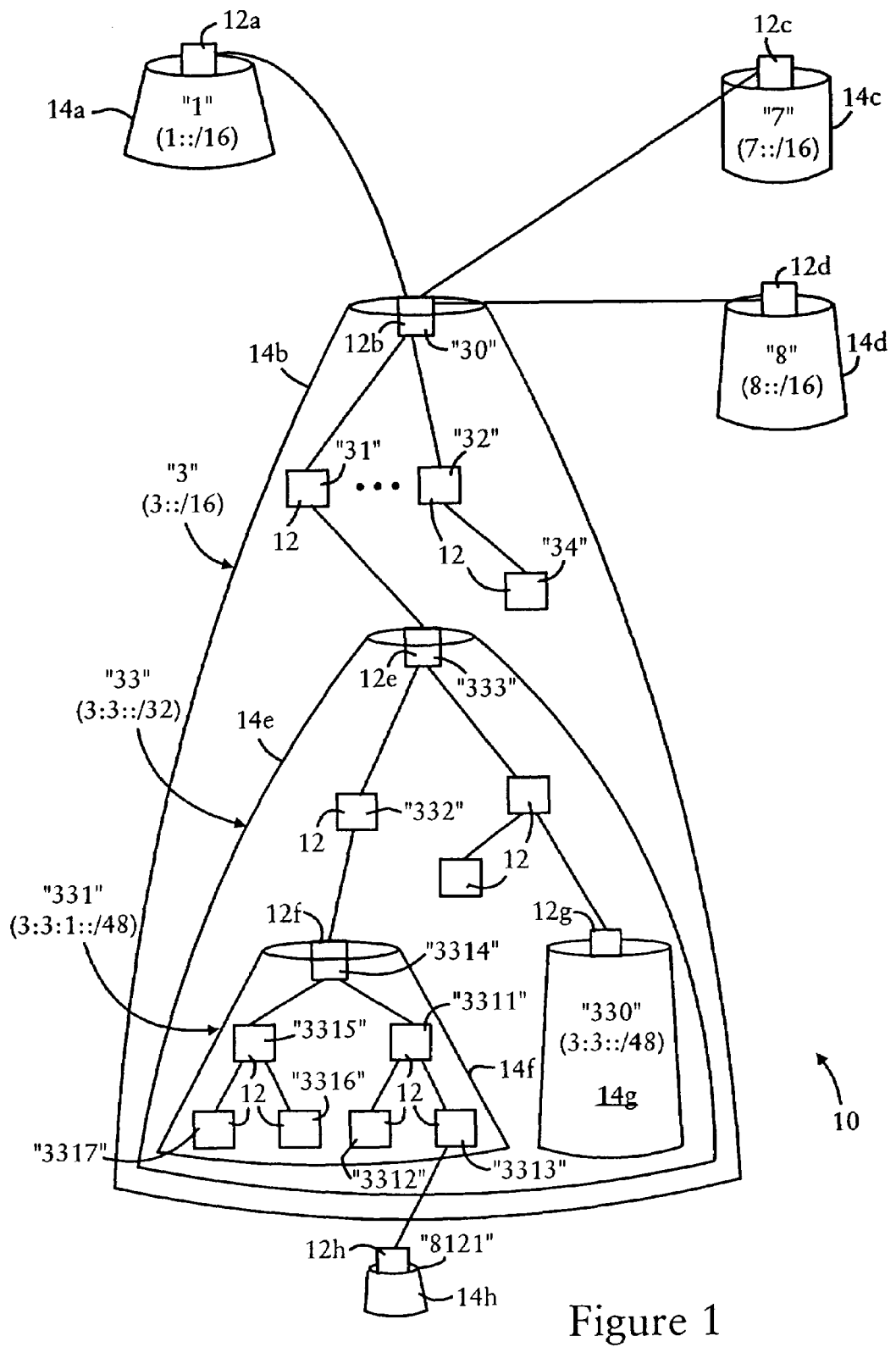
FIG. 1 is a diagram illustrating a mobile ad hoc network of mobile ad hoc routers having aggregated into a tree-based collection of aggregation groups, according to an embodiment of the present invention.

FIG. 1 is a diagram illustrating a mobile ad hoc network 10 formed by mobile ad hoc routers 12 self-organizing into a tree-based topology having a single network clusterhead 12a, according to an embodiment of the present invention. Each mobile ad hoc router 12 is configured for advertising its presence in the ad hoc network 10 based on outputting router advertisement messages, described below. Any mobile ad hoc router 12 detecting the router advertisement messages can selectively attach to the advertising mobile ad hoc router, which now serves as an attachment router.

As described above, prior attachment techniques such as described in the above-incorporated U.S. Patent Publication No. US 2004/0032852 enabled individual mobile routers to choose an attachment router that belongs to a tree-based ad hoc network based on advertised attributes that describe the position of the advertising attachment router relative to the physical structure of the tree. For example, the U.S. Patent Publication No. US 2004/0032852 describes that an advertisement resource may include a tree information option specifying a tree identifier (e.g., an IP address of the top level mobile router (TLMR) or IEEE based 64-bit extended unique identifier (EUI-64) based link local address), a tree group identifier (e.g., an IPv6 address of a mobile router attached to the TLMR), a preference field, a tree depth field, a fixed/ mobile field, and a delay timer field. Hence, the tree identifier and the tree group identifier enable a mobile router to distinguish between multiple branches in the same mobile ad hoc network. Although the tree information option described in U.S. Patent Publication No. US 2004/0032852 enables a mobile ad hoc router to identify a specific structural position of a tree-based mobile ad hoc network, it does not provide sufficient information to enable the aggregation of nodes into an identifiable group in an organized manner; hence, the prior published tree information is unable to enable mobile ad hoc routers to autonomously create an ad hoc network in the form of a tree-based hierarchy of organized groups.

According to the disclosed embodiment, each mobile router is assigned a hierarchy position within an identified aggregation group. In particular, the identified aggregation group establishes a membership attribute for the mobile ad hoc router 12 that serves as a primary basis for the mobile ad hoc router 12 in deciding whether to attach to another mobile router 12. In other words, each mobile router 12 will tend to form attachments with other mobile ad hoc routers 12 that are within the same aggregation group, or at least that share common attributes (e.g., one aggregation group is a subset (i.e., contained by) another aggregation group), and tend to avoid attachments with other mobile ad hoc routers that are in distinct aggregation groups that have distinct aggregation attributes.

Hence, the mobile ad hoc routers 12 will tend to aggregate into the tree-structured network topology 10 of FIG. 1 as a tree of aggregation groups 14*a*, 14*b*, 14*c*, and 14*d* (a "tree of trees"). Each of the aggregation groups 14*a*, 14*b*, 14*c* and 14*d* are referred to as "dominant aggregation groups", where dominant aggregation groups are defined as aggregation groups having distinct (i.e., and mutually exclusive) aggregation group attributes. For example, FIG. 1 illustrates that the dominant aggregation groups 14*a* 14*b*, 14*c*, and 14*d* are identified by the respective labels "1", "3", "7", and "8" based on the respective IPv6 address prefixes "1::/16", "3::/16", "7:/16", and "8::/16". Hence, each of the dominant aggregation groups 14*a*, 14*b*, 14*c* and 14*d* have mutually exclusive aggregation group attributes in the form of mutually exclusive address ranges.

In contrast, the dominant aggregation group 14*b* is illustrated as a tree of attached mobile routers 12 and containing subordinate aggregation groups 14*e*, 14*f* and 14*g* having respective assigned address prefixes "3:3::/32", "3:3:1::/48", and "3:3:0::/48". The aggregation group 14*e* has an assigned address prefix of "3:3::/32" and therefore contains the aggregation groups 14*f* and 14*g*; in other words, the aggregation group 14*e* serves as an attachment group for the attached aggregation groups 14*f* and 14*g*. Hence, the subordinate aggregation groups 14*f* and 14*g* are mutually exclusive with respect to their 48-bit address prefixes, however, they share an aggregation attribute in the form of a common 32-bit prefix (3:3::/32), illustrated in FIG. 1 by their shared membership in the same attachment aggregation group 14*e* (i.e., both aggregation groups 14*f* and 14*g* are contained in aggregation group 14*e*).

Hence, mobile routers can choose an attachment router based on identifying a best match for their assigned hierarchy position within their identified aggregation group (e.g., a longest matching address prefix), among identifiable hierarchy positions of identifiable aggregation groups advertised by available mobile routers.

As will become apparent from the following description, each aggregation group (e.g., 14*b*, 14*e*, 14*f*, 14*h*) described herein can be identified by a corresponding label (e.g., "3", "33", "331", "8121") that represents a numeric representation of the corresponding assigned address prefix (e.g., "3::/16", "3:3::/32", "3:3:1::/48", "8:1:2:1::/64"); hence, the label of an aggregation group can be used to identify the corresponding assigned address prefix, and vice versa; alternately, if an address prefix is assigned to a single mobile router, for example the mobile router 12*f* has exclusive ownership of the address prefix "3:3:1:4::/64", then the corresponding label "3314" can be used to identify that mobile router 12*f*.

As illustrated in FIG. 1, each aggregation group 14*a*, 14*b*, 14*c*, 14*d*, 14*e*, 14*f*, 14*g* and 14*h* has a single corresponding mobile ad hoc router 12*a*, 12*b*, 12*c*, 12*d*, 12*e*, 12*f*, 12*g*, and 12*h* operating as a root for the corresponding aggregation group. Each root is configured for outputting filtered routing information toward the network clusterhead 12*a*, resulting in a scalable routing protocol based on each root removing unnecessary group-specific routing information from messages destined toward the clusterhead. Consequently, the disclosed embodiment does not simply rely on the tree-based topology (i.e., loop-free) to minimize the amount of routing information, but also actively filters group-specific routing information that is no longer needed by nodes of attachment aggregation groups or other dominant aggregation groups. Hence, scalable routing information, for example aggregated address prefix information, can be sent toward the network clusterhead 12*a*, with group-specific routing information being added by the root (e.g., 12*f*) for network traffic entering the aggregation group (e.g., 14*f*) from an attachment aggregation group (e.g., 14*e* via attachment router "332").

Hence, each root 12*a*, 12*b*, 12*c*, 12*d*, 12*e*, 12*f*, 12*g*, and 12*h* is configured for utilizing its hierarchy position within its aggregation group in order to filter routing information from packets destined toward the clusterhead, and add routing information to packets received from its attachment router and destined within its corresponding aggregation group.

Figure 2:
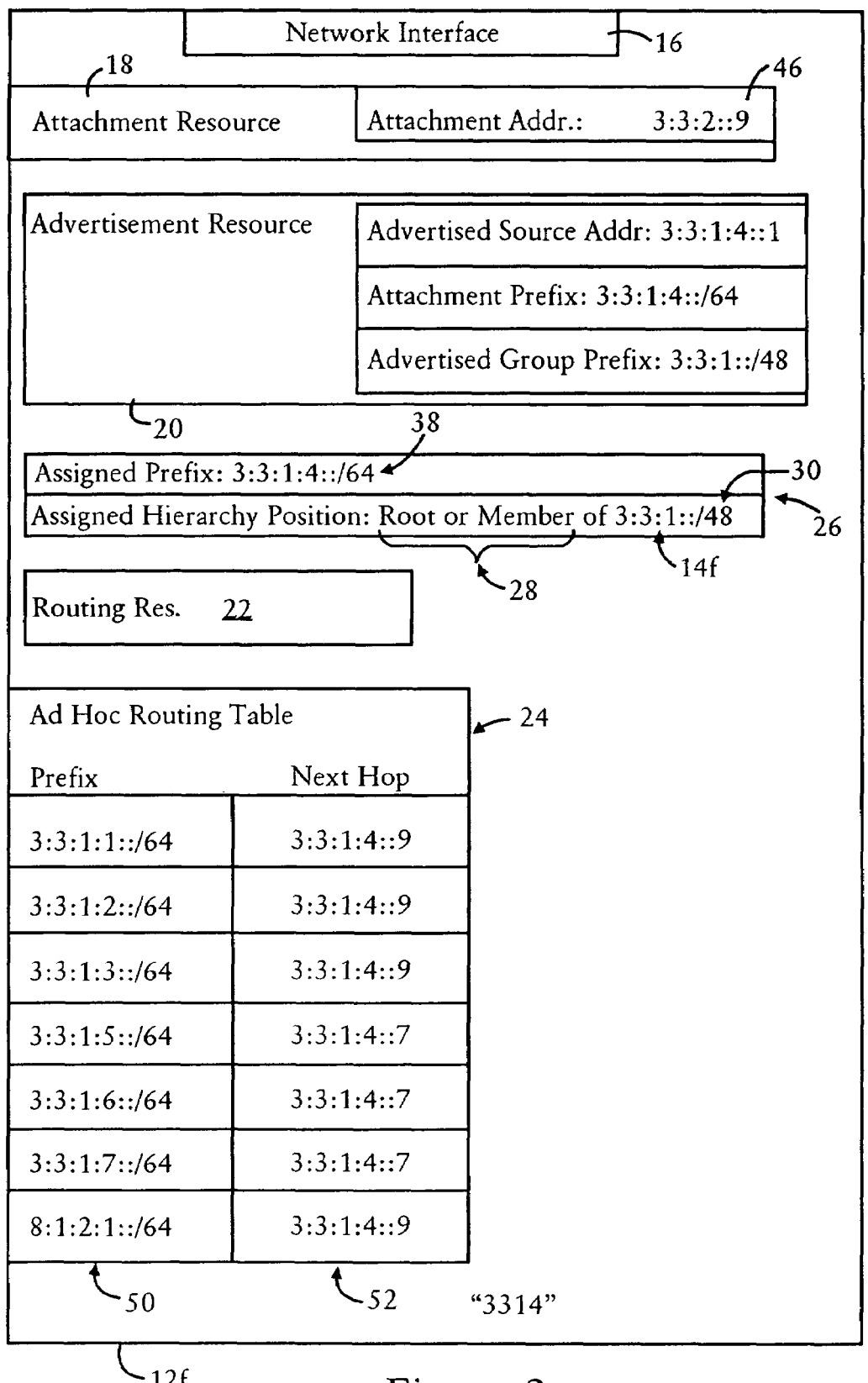
FIG. 2 is a diagram illustrating one of the mobile ad hoc routers of FIG. 1, according to an embodiment of the present invention.

FIG. 2 is a diagram illustrating an exemplary one of the mobile ad hoc routers 12*f* of FIG. 1, according to an embodiment of the present invention. Each mobile router 12 includes a network interface 16, an attachment resource 18, an advertisement resource 20, a routing resource 22, an ad hoc routing table 24, and memory 26 for storing configuration information, including an assigned hierarchy position 28 within an identified aggregation group 30 (e.g., 14*f*).

Figure 3:
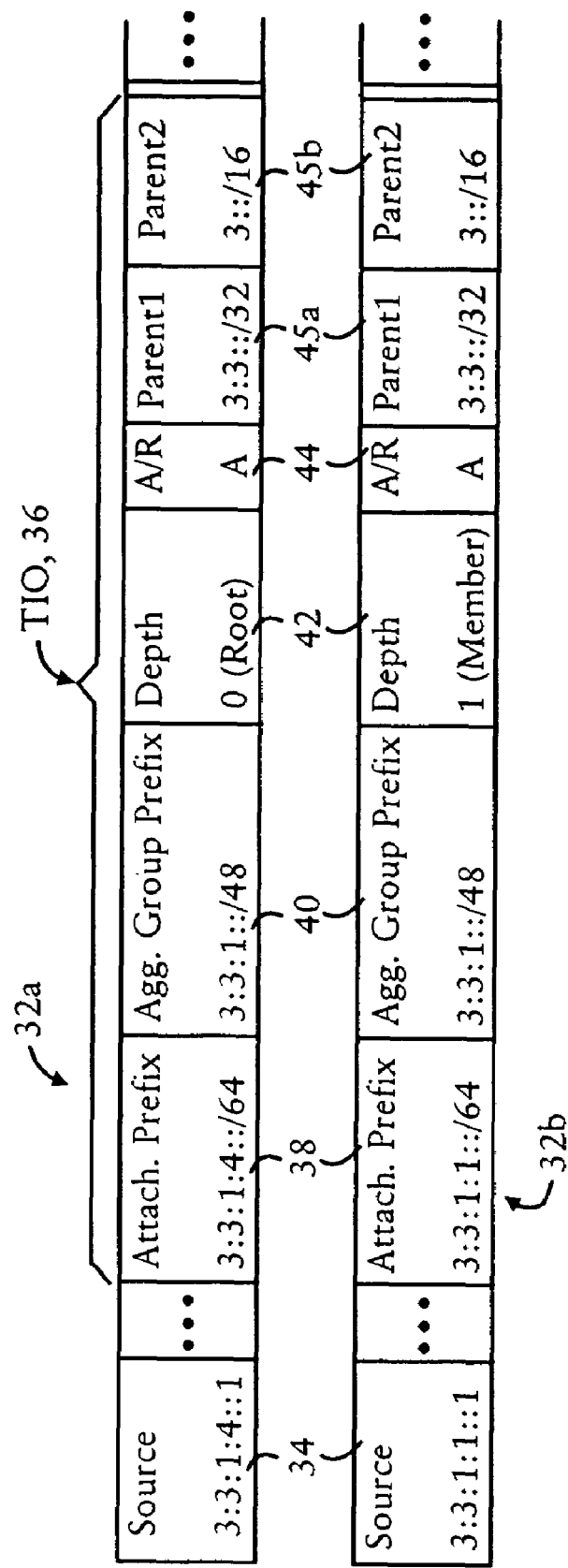
FIG. 3 is a diagram illustrating router advertisement messages output by a root node and a subordinate node of an aggregation group, according to an embodiment of the present invention.

The network interface 16 is configured for sending and receiving router advertisement messages (e.g., 32*a* or 32*b* as illustrated in FIG. 3), and sending and receiving packets to either attached mobile routers or an attachment mobile router. Hence, the network interface 16 implements a logical ingress port for traffic sent and received from "downstream" nodes (i.e., away from the network clusterhead 12*a*), and a logical egress port for traffic sent and received from the attachment router that is "upstream" (i.e., toward the network clusterhead 12*a*).

The attachment resource 18 is configured for storing information from the received router advertisement messages in an internal candidate attachment list (not shown), and identifying from among the available mobile ad hoc routers a best match for attaching to one of the available mobile ad hoc routers, based on the assigned hierarchy position 28 of the mobile router (e.g., 12*f*) within its assigned aggregation group 30. As described below with respect to FIG. 4A, if the attachment resource 18 determines from the assigned hierarchy position 28 that the mobile router 12*f* is eligible to attach to its parent group (i.e., attachment group) (e.g., 14*e*) as a root of its assigned aggregation group 30 (e.g., 14*f*), the attachment resource 18 will attach to the parent group if there is no prior attachment by the assigned aggregation group to the parent group. Alternate attachments are available, depending on the existing network topology, the assigned hierarchy position 28 and assigned aggregation group 30, relative to the availability of the assigned aggregation group or the parent group.

The advertisement resource 20 is configured for outputting an advertisement message (e.g., 32*a*) of FIG. 3, based on the assigned hierarchy position 28 of the mobile router 12 within its aggregation group 30. In particular, the advertisement resource 20 advertises the attributes that describe the position of the mobile ad hoc router within the tree structured network topology, as well as the relative hierarchy position within the advertised aggregation group. As illustrated in FIG. 3, in the case where the mobile router 12*f* is attached to the attachment router "332" 12, the advertisement resource 20 of the mobile router 12*f* generates the router advertisement message 32*a* that includes a source address field 34 and a tree information option (TIO) 36. The tree information option 36 includes an attachment prefix field 38, an aggregation group prefix field 40, and an identifiable hierarchy position: the identifiable hierarchy position is illustrated as a depth 42 of the tree within the specified aggregation group 40, an attached/roaming (A/R) flag field 44, and parent group identification fields 45*a* and 45*b* that identify attachment groups (i.e., parent groups) relative to the aggregation group 40.

The source address field 34 specifies a source address used by the mobile router 12 within its corresponding assigned address prefix 38. The attachment prefix 38 specifies the assigned prefix owned by the mobile router 12 and that is to be used for an attachment to the mobile router. For example, the router advertisement message 32*a* output by the mobile router 12*f* has a source address field 34 that specifies a source address value of "3:3:1:4::1" that is within the address space of the corresponding attachment prefix "3:3:1:4::/64" 38 assigned to the mobile router 12*f*; in contrast, the router advertisement message 32*b* output by the mobile router "3311" 12 of FIG. 1 has a source address field 34 that specifies a source address value of "3:3:1:1::1" that is within the address space of the corresponding attachment prefix "3:3:1:1::/64" assigned to the mobile router "3311" 12.

However, both mobile routers 12*f* and "3311" 12 output the same aggregation group prefix ("3:3:1::/48") 40 based on both mobile routers being a member of the same aggregation group 14*f*. The depth field 42 specifies the relative hierarchy position of the advertising mobile router (identified by the source address field 34) within the specified aggregation group 40, in other words the number of hops in order to reach the root of the aggregation group. Hence, the router advertisement message 32*a* specifies a corresponding depth 42 of "0" for the mobile router 12*f* and the router advertisement message 32*b* specifies the corresponding depth 42 of one hop for the mobile router "3311" 12 that is a member of the aggregation group 14*f* and one hop from the root 12*f*.

The attached/roaming (A/R) flag field 44 identifies if the root of the advertised aggregation group 40 is attached ("A") to an attachment router, or roaming ("R") within the ad hoc network 10 without an attachment. If the root of the advertised aggregation group is attached to an attachment router, the advertisement resource 20 inserts the parent group identification fields (e.g., 45*a* and 45*b*) that identify the respective attachment groups within the tree-structure topology. As illustrated in FIG. 1, the aggregation group 14*f* is contained within the aggregation group 14*e*, and the aggregation group 14*e* is contained within the dominant aggregation group 14*b*.

Hence, the parent group identification fields 45*a* and 45*b* explicitly specify the hierarchy position of the advertised aggregation group 14*f* (specified in the aggregation group prefix field 40) within the tree structured topology 10 of FIG. 1 based on identifying the sequence of attachment groups 14*e* and 14*f*. Consequently, a node receiving the advertisement message 32*a* can apply additional heuristics to its tree discovery and selection procedures to determine whether the aggregation group (e.g., 14*f*) specified in the aggregation group prefix field 40 is a "best match" within the aggregation hierarchy based on the aggregation group membership in the parent groups explicitly identified in the parent group identification fields 45*a* and 45*b*. The use of parent fields (e.g., 45*a*, 45*b*) are particularly beneficial in identifying non-aggregating parent groups that are visiting (e.g., 14*h*) but that advertise the aggregated group (e.g., node 12*h* advertises the aggregation group 14*f* in the aggregated group prefix field 40). Additional details describing the use of the parent fields 45*a*, 45*b* for identification of a best match within the aggregation hierarchy is described below with respect to FIG. 8.

Hence, in response to the attachment resource 18 of the mobile router 12*f* attaching to the mobile router "332" 12 using the attachment address (i.e., care of address) "3:3:2::9" 46 within the address space "3:3:2::/48" of the mobile router "332" 12, as illustrated in FIG. 2, the advertisement resource 20 of the mobile router 12*f* outputs the router advertisement message 32*a*, specifying via the attached/roaming (A/R) flag field 44 that the mobile router 12*f* is attached to an attachment router in the attachment group 14*e* (specified in parent field 45*a*), and that the parent attachment group 14*e* is attached to its parent group 14*b* (specified in the parent field 45*b*). The mobile router "331" outputs the router advertisement message 32*b* indicating that it is a member of the aggregation group 14*f*, and one hop away from the root, and also includes the parent fields 45*a* and 45*b*.

Hence, any mobile router receiving either of the router advertisement messages 32*a* or 32*b* can determine the identifiable aggregation group 14*f* based on the specified prefix 40; depending on implementation, the identifiable hierarchy position of the mobile ad hoc router 12 outputting the advertisement message 32 can be interpreted in terms of the length of the group prefix, where a fewer number of bits in the group prefix indicates a higher position within the group hierarchy relative to the dominant aggregation group, the depth field 42 indicating whether the advertising mobile ad hoc router is a router of the corresponding aggregation group or a member thereof, and the attached/roaming (A/R) flag field 44 indicating whether the aggregated group specified in the prefix field 40 is roaming, or attached to its parent aggregation group. Further, any mobile router receiving the router advertisement messages 32*a* or 32*b* can determine whether attachment is preferred, for example in the case of a peer root of a distinct aggregation group forming a branch with the other root. Hence, roaming roots of aggregated groups can merge with other aggregated groups during initial network formation, enabling the collection of distinct aggregation groups to coalesce to form the appropriate parent aggregation groups and dominant aggregation groups toward formation of the tree-based topology of dominant aggregation groups. Also note that various heuristics may be applied, especially during roaming and initial network formation, for the attachment resource 18 to determine the best match in terms of a relative hierarchy position within a localized aggregation group (e.g., based solely on depth 42), or an absolute hierarchy position within the dominant aggregation group based on the advertised aggregation group 40, and identified parents 45*a*, 45*b*, etc., described in detail below with respect to FIG. 8.

The routing resource 22 of FIG. 2 is configured for routing packets according to the ad hoc routing table 24, where any destination not specified in the ad hoc routing table is output toward the attachment router as the default interface. The routing resource 22 also is configured for storing routing information received from attached network nodes, filtering group-specific information from the routing information, and outputting the filtered routing information with summary information to the attachment mobile router.

For example, if neighbor advertisement messages are received as described in the published U.S. Patent Publication No. 2005/0265259, the routing resource 22 populates the ad hoc routing table 24 with the reachable prefixes 50 and next-hop addresses 52, and outputs filtered neighbor advertisement messages toward the clusterhead, described below with respect to FIG. 5. If packets are received that specify reverse routing headers as described in the published U.S. Patent Publication No. 2004/0117339, the routing resource 22 caches the reverse routing headers as needed, and outputs filtered packets toward the clusterhead 12a with summary routing information after having filtered the group-specific routing information of next-hop addresses within the corresponding aggregation group 14, described below with respect to FIGS. 6A and 6B.

Hence, the routing resource 22 filters group-specific routing information related to the corresponding aggregation group 14 from packets received from attached mobile routers, and replaces the group-specific routing information with summary routing information prior to outputting the packets to the attachment router toward the clusterhead.

Figure 4A:
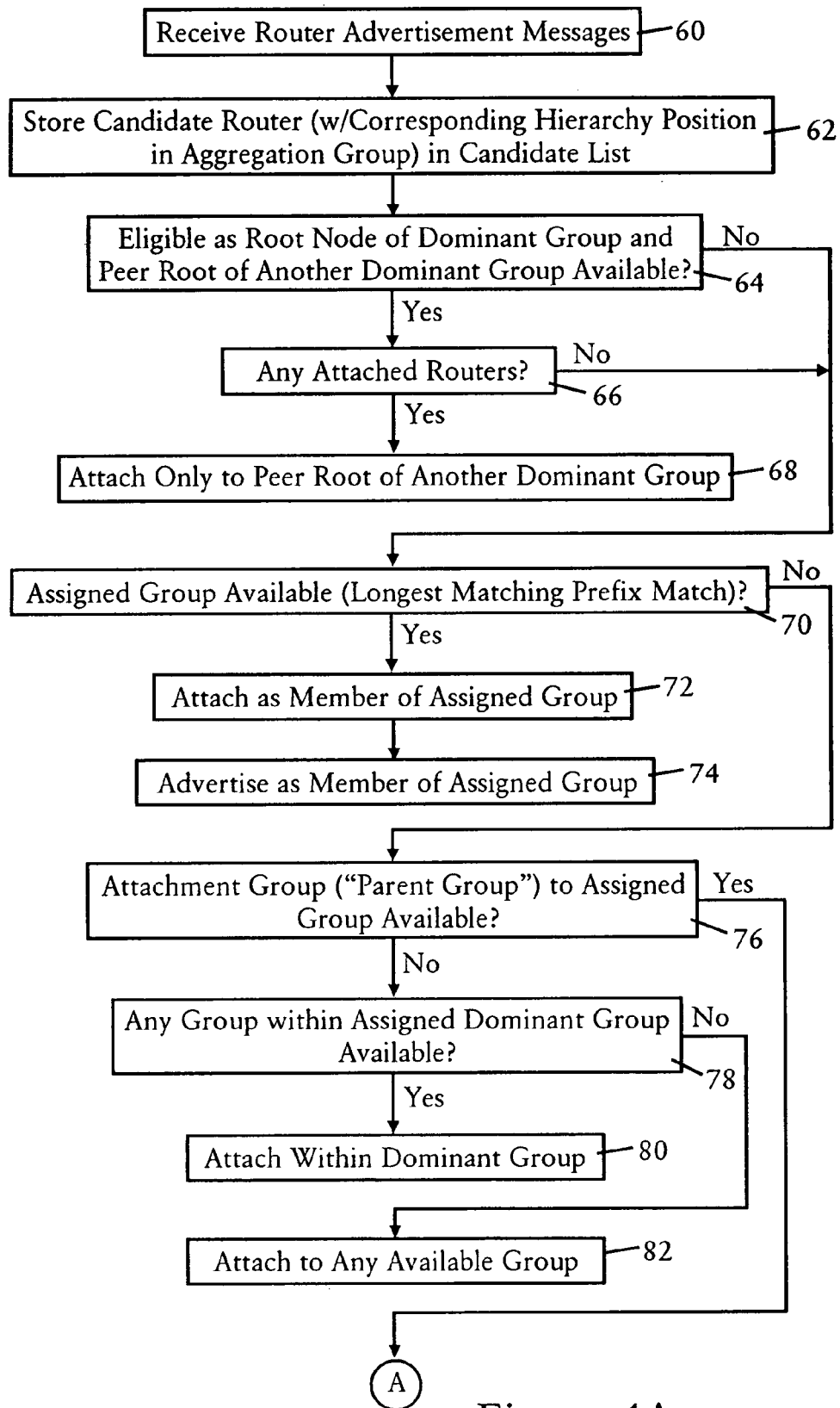
FIGS. 4A and 4B are diagrams illustrating the method by the mobile ad hoc routers of attaching to each other to form the mobile ad hoc network of FIG. 1, and filtering group-specific routing information, according to an embodiment of the present invention.
Figure 4B:
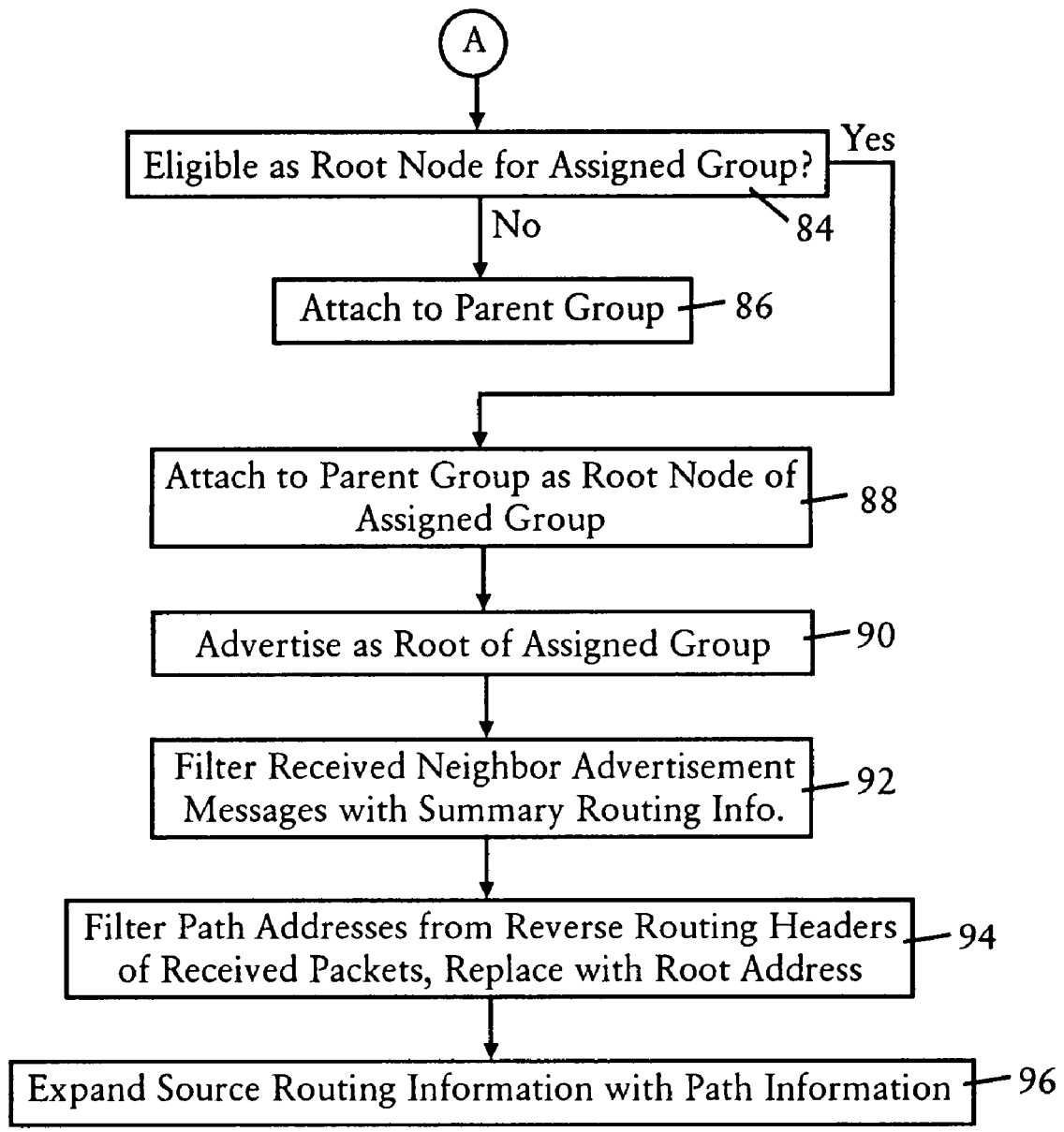

FIGS. 4A and 4B are diagrams summarizing the method by each of the mobile ad hoc routers 12 of independently attaching to an attachment router according to identifying a best match relative to an assigned hierarchy position within an identified aggregation group, from among the identifiable hierarchy positions of identifiable aggregation groups, according to an embodiment of the present invention. The steps described in FIGS. 4A and 4B can be implemented as executable code stored on a computer readable medium (e.g., a hard disk drive, a floppy drive, a random access memory, a read only memory, an EPROM, a compact disk, etc.), or propagated via a computer readable medium (e.g., a transmission wire, an optical fiber, a wireless transmission medium utilizing an electromagnetic carrier wave, etc.).

The method begins by the preconfiguration of each mobile router 12 with its assigned hierarchy position 28 within its corresponding identified aggregation group 30. Each mobile router 12 may be statically configured, for example based on a network administrator manually inputting the appropriate values 28, 30 and 38 within the internal memory 26 of the mobile router 12; alternately, a dynamic registration may be performed upon initialization of the mobile ad hoc router 12, for example the mobile router receiving a dynamically-delegated prefix by a root node (12a, 12b, 12c . . . 12h) within the relevant aggregation group 14, as illustrated by the prefix delegation resource disclosed in U.S. Patent Publication 2005/0099971, published May 12, 2005, entitled "Arrangement in an Access Router for Optimizing Mobile Router Connections Based on Delegated Network Prefixes", the disclosure of which is incorporated in its entirety herein by reference.

Assuming the mobile router has been configured with its assigned prefix 38, its assigned hierarchy position 28 within its assigned aggregation group 30, the attachment resource 18 receives in step 60 router advertisement messages via the network interface 16, such as the router advertisement messages 32a or 32b illustrated in FIG. 3. The attachment resource 18 stores in step 62 the candidate attachment routers, including the tree information option information such as the hierarchy position within the advertised aggregation group as determined based on the combination of the aggregation group prefix field 40, the depth 42 of the advertising mobile router, and the attachment flag 44.

The attachment resource 18 will use different heuristics depending on whether the mobile router 12 is configured to serve as a root node (i.e., an aggregator). If the mobile node 12 is configured as an aggregator, the attachment resource 18 will determine the longest match that encloses its aggregation prefix 30, but will not use its assigned mobile network prefix 38 to find a best match. If the mobile node is not configured as an aggregator, the attachment resource 18 will search for a best match relative to its mobile network prefix 38; hence, the non-aggregating mobile node 12 uses its mobile network prefix 38 as if it was the assigned aggregation in order to identify the best match.

The attachment resource 18 first determines in step 64 whether the mobile router 12 is eligible as a root node of a dominant group (e.g., 14a, 14b, 14c, or 14d), and whether a peer root of another dominant group is available for communication or attachment. If the mobile router 12 is eligible as a root node of a dominant group, and the mobile router 12 already has other attached routers in step 66, then the mobile router attaches only to the peer root of another dominant group in step 68 in order to establish a new dominant group. In this case, steps 64, 66 and 68 enable the root nodes 12a, 12b, 12c and 12d to attach to each other in a top-level tree structure resulting in the tree of dominant aggregation groups.

Assuming in step 64 that the mobile router 12 is not eligible as a root node of a dominant aggregation group, or that there are no attached routers in step 66 (such that creation of a new dominant aggregation group is unnecessary), the attachment resource 18 determines in step 70 whether the assigned aggregation group 30 is already available for attachment, based on a match in the longest bit prefix between the identified aggregation group 30 stored in the memory 26 and an advertised available aggregation group 40 from a received router advertisement message 32. If the assigned group 30 is already available, indicating that another node has established itself as a root node of the assigned group 30, the attachment resource 18 attaches in step 72 the mobile router 12 as a member of the assigned group 30, causing the router advertisement resource 20 to advertise in step 74 that the mobile router 12 is a member of the assigned group 30 (i.e., the depth field 42 specifies a value greater than or equal to 1).

If in step 70 the assigned group 30 is not available, the attachment resource 18 determines in step 76 whether the parent group (i.e., the attachment group for the assigned group 30) is available. If in step 76 the parent group is not available, then the attachment resource 18 determines whether any group within the assigned dominant group is available, in other words any group that has any shared attribute with the assigned group 30 such as the first eight prefix bits (e.g., 3::/16).

If in step 78 any group within the assigned dominant group is available, the attachment resource 18 attaches within the dominant group in step 80; otherwise; if no group within the assigned dominant group is available, then the mobile router is roaming outside of its dominant group, and therefore attaches to a visited group in step 82. An example of a mobile router attaching to a visited group is illustrated in FIG. 1 by the mobile router 12h, which serves as the root for the aggregation group 14h: the aggregation group 14h has the assigned aggregation prefix "8:1:2:1::/64" that is distinct from the attachment mobile router "3313" 12 within the aggregation group 14f, hence no aggregation of routing information is possible. However in this case, the visiting aggregation group 14h still has connectivity within the mobile ad hoc network 10. If the mobile router 12h later detects an advertisement message from its aggregation group 14d, the mobile router 12h can reconnect within its dominant aggregation group 14d for aggregation of the routing information associated with the aggregation group 14h. Further examples of steps 80 and 82 are described below with respect to FIG. 8.

Referring to step 76, if the parent group is available, then if in step 84 of FIG. 4B the assigned hierarchy position 28 specifies that the mobile router is eligible as a root node, the attachment resource 18 attaches in step 88 as the root node for the assigned aggregation group 30, else the attachment resource 18 attaches to the parent group in step 86. As described previously, attaching within the assigned group is optimal for purposes of aggregating routing information, described below; however, attaching within the parent group or another group within the dominant group still enables at least one of the roots within the dominant aggregation group to filter group-specific routing information from being transmitted to other roots of dominant aggregation groups.

Assuming in step 88 that the mobile router 12 (e.g., 12f) has attached to the parent group (e.g., 14e) as the root node of the assigned group (14f), the advertisement resource 20 of the root node advertises in step 90 as the root of the assigned group by outputting the router advertisement message 32a illustrated in FIG. 3.

As described above, the routing resource 22 of the root node (e.g., 12f) is configured for filtering in step 92 received neighbor advertisement messages with summary routing information, described in detail below with respect to FIG. 5. The routing resource 22 of the root node also is configured for filtering path addresses in step 94 from reverse routing headers of received packets, and replacing the group-specific information in the reverse routing headers with summary information as described below with respect to FIGS. 6A and 6B. The routing resource 22 of the root node also is configured for expanding source routing information for packets received from the attachment router with group-specific path information for reaching a specified destination.

Hence, the routing resource 22 of each of the root nodes removes group-specific routing information for packets destined toward the network clusterhead, and inserts the group-specific routing information for packets entering the aggregation group via the attachment router.

Figure 5:
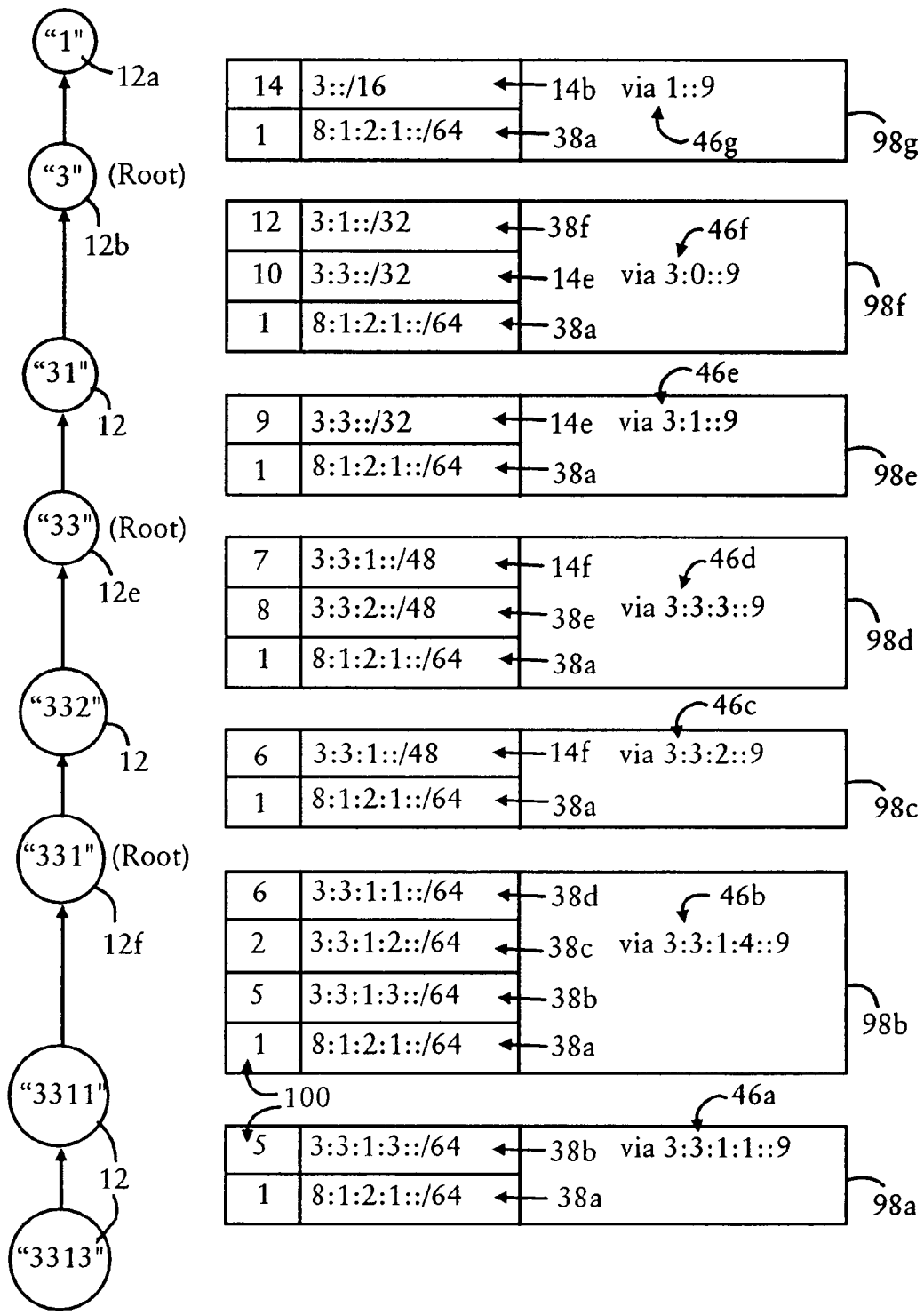
FIG. 5 is a diagram illustrating the filtering of neighbor advertisement messages destined toward the network clusterhead, according to one embodiment of the present invention.

FIG. 5 is a diagram illustrating the successive propagation of neighbor advertisement messages (e.g., 98a, 98b, 98c, . . . 98g) by respective mobile routers within the dominant aggregation group 14b, including replacing group-specific routing information with summary route information, according to an embodiment of the present invention. FIG. 5 is a modification of the propagation of neighbor advertisement messages as illustrated in FIG. 2 of the above-incorporated U.S. Patent Publication No. US 2005/0265259, in that the root nodes 12b, 12e, and 12f within the dominant aggregation group 14b filter the group-specific routing information to minimize the routing information sent to the network clusterhead 12a.

As illustrated in FIG. 5, the mobile router "3313" 12 outputs the neighbor advertisement message 98a to its attachment router "3311" 12 specifying that the visiting address prefix 38a of the visiting mobile router 12h (and its aggregation group 14b) and the assigned prefix 38b of the mobile router "3313" 12 are reachable via the attachment address 46a. Each neighbor advertisement message entry also includes a corresponding sequence identifier 100 that enables each routing resource 22 to determine whether the entry includes updated routing information.

The routing resource 22 of the mobile router "3311" 12, in response to receiving the neighbor advertisement message 98a, updates its ad hoc routing table 24 and outputs an updated neighbor advertisement message 98b, as described in the above-incorporated U.S. Patent Publication No. US 2005/0265259, by adding that the attached prefixes 38c and 38d also are reachable via the corresponding attachment address 46b. It should become readily apparent at this stage that the size of the neighbor advertisement message 98 would increase dramatically if each and every address prefix in the aggregation group 14b was supplied to the clusterhead 12a.

Hence, according to the disclosed embodiment, each root is configured for filtering group-specific routing information, and replacing the group-specific routing information with summary information 102. Hence, the routing resource 22 of the root node 12f replaces the group-specific address prefixes 38b, 38c and 38d with the summary prefix 14f that identifies the corresponding aggregation group. Hence, the routing resource 22 of the root node 12f outputs the neighbor advertisement message 98c to the attachment router "332" 12 in the parent aggregation group 14e, specifying that the visiting address prefix 38a and the summary prefix 14f are reachable via the attachment address 46c.

The attachment router "332" 12 outputs the neighbor advertisement message 98d specifying that the address prefixes 38a, 38e, and the summary prefix 14f are reachable via the attachment address 46d. Note that whether the mobile router "332" 12 represents another root of another aggregation group (and whether the prefix 38e represents another summary prefix) is inconsequential, since it would be considered a peer aggregation group relative to the aggregation group 14f. However, the routing resource 22 of the mobile router 12e, as the root of the parent aggregation group 14e, filters the group-specific routing information by replacing the prefixes 14f and 38e with the summary prefix 14e. Hence, the mobile router 12e outputs the neighbor advertisement message 98e specifying that the visiting address prefix 38a and the summary prefix 14e are reachable via the attachment address 46e.

After the mobile router "31" 12 adds its routing information 38f to specify in the neighbor advertisement message 98f that the address prefixes 14e, 38a, and 38f are reachable via the attachment address 46f, the routing resource 22 of the root node 12b replaces the group-specific address prefixes 14e and 38f with a single summary prefix 14b, and outputs to the network clusterhead 12a the neighbor advertisement message 98g that specifies the summary prefix 14b and the visiting address prefix 38a are reachable via the attachment address 46g.

Hence, the roots of the aggregation groups utilize the aggregation hierarchy to limit the amount of routing information that needs to be sent in the neighbor advertisement messages to the network clusterhead 12a.

Figure 6A:
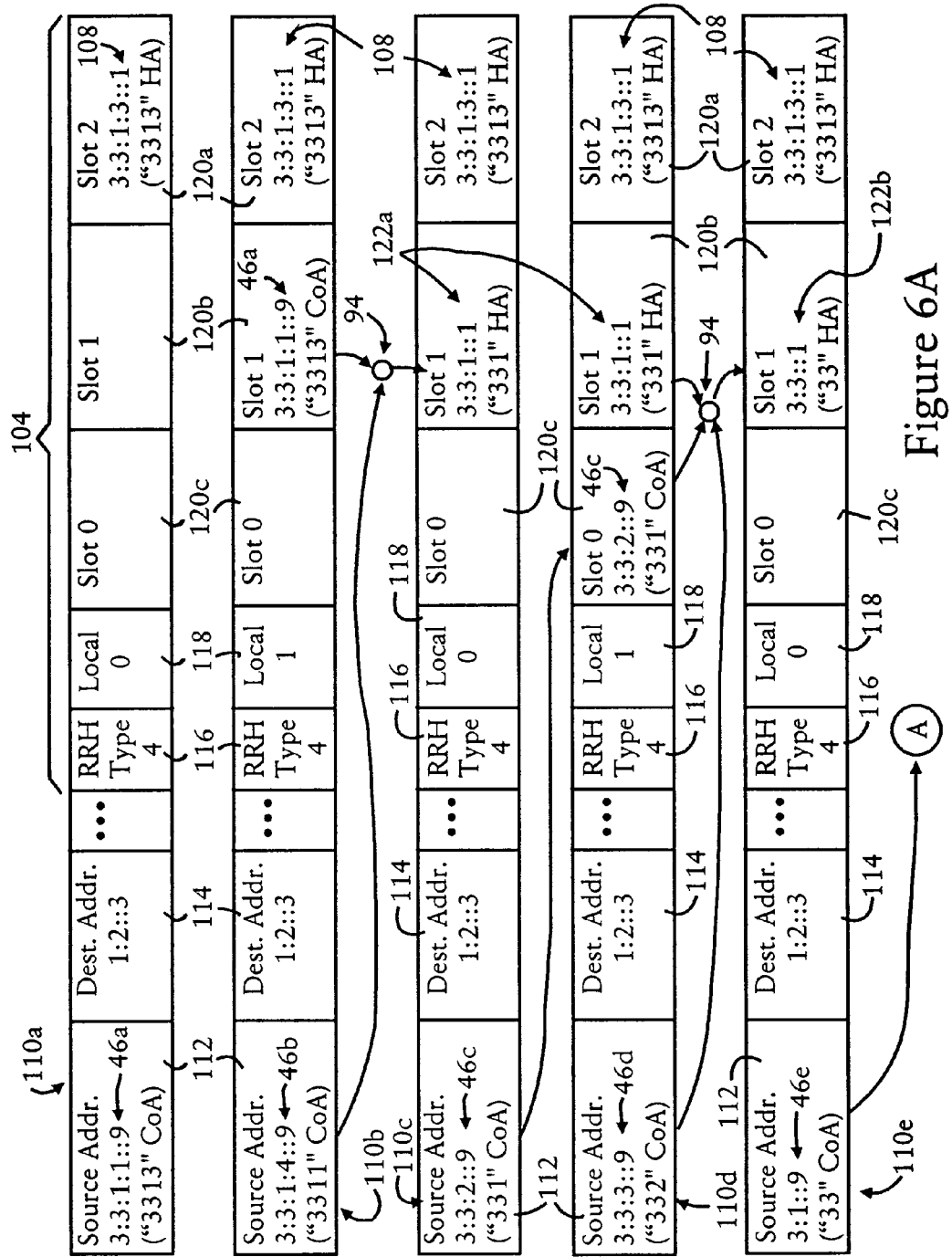
FIGS. 6A and 6B are diagrams illustrating the filtering of reverse routing headers destined toward the network clusterhead, according to one embodiment of the present invention.
Figure 6B:
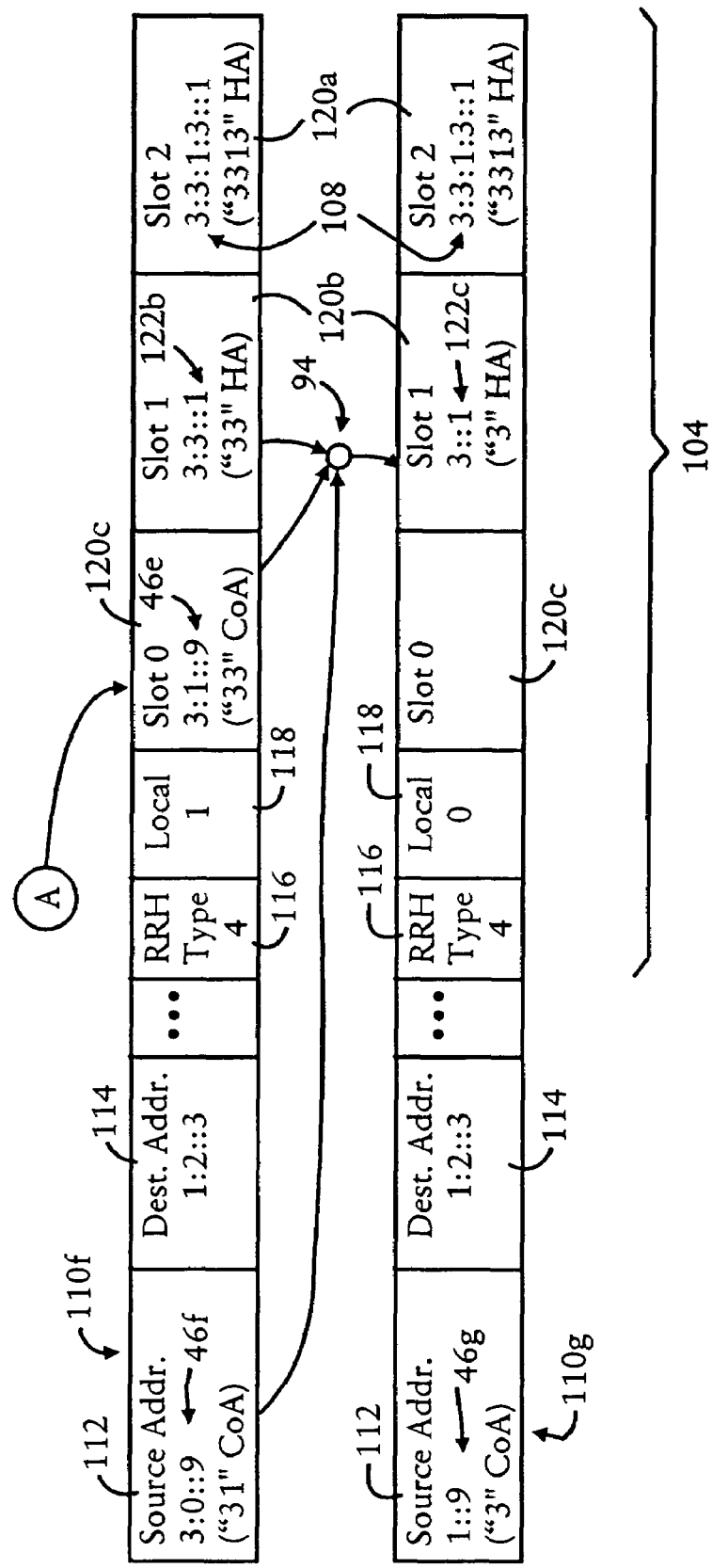

FIGS. 6A and 6B are diagrams illustrating modification of a reverse routing header 104 within data packets 110a, 110b, . . . 110g transmitted from the mobile router "3313" 12 to a correspondent node in the aggregation group 14a, according to an embodiment of the present invention. Each data packet 110 includes a source address field 112, a destination address field 114, and a reverse routing header 104 that includes a routing header type field 116, a local index field 118, and routing slots 120a, 120b, and 120c. In particular, FIGS. 6A and 6B illustrate modification of the reverse routing headers described in the above-incorporated published U.S. Patent Publication No. US 2004/0117339, in that group-specific routing information is removed from the reverse routing header 14, and replaced with summary routing information. The following description describes compression of the reverse routing headers 104 by the roots of the aggregation groups, however any mobile node 12 can perform the compression described herein, regardless of any aggregation hierarchy, based solely on determining that the reverse routing header 104 is exceeding a desired size.

For example, the packet 110a output by the mobile router "3313" 12 specifies the attachment address 46a in the source address field 112, and the home address 108 utilized by the mobile router "3313" 12 in the slot 120a of the reverse routing header 104. The mobile router "3311" 12 updates the reverse routing header 104, as described in the published U.S. Patent Publication No. US 2004/0117339, by moving the source address value 46a to the next slot position 120b, and adding its own attachment address 46b to the source address field 112 of the data packet 110b.

The routing resource 22 of the mobile router 12f, however, operates as the root of the aggregation group 14f by caching the reverse routing header 104 of the received data packet 110b (assuming the above-described neighbor advertisement messages are not employed), and replacing in step 94 the group-specific address information 46a and 46b with the root address 122a and the attachment address 46c, respectively, for the data packet 110c. The local segment field 118 enables a root to identify that the packet is transitioning to a new level of hierarchy, based on the local segment field 118 being reset to zero.

After the mobile router "332" 12 updates the data packet 110d based on the received data packet 110c by inserting the attachment address 46c into the slot 120c and adding its own attachment address 46d into the source address field 112, the mobile router 12e filters the reverse routing header in step 94 by replacing the group-specific addresses 46c and 122a with its own summary route information, namely the corresponding root address 122b into slot 120b of packet 110e, and adding its own attachment address 46e in the source address field 112 of the packet 110e. The mobile router 12e also resets the local segment field 118 to zero.

Referring to FIG. 6B, after the mobile router "31" 12 updates the reverse routing header by inserting the attachment address 46e into the available slot 120c and adding its corresponding attachment address 46f into the source address field 112 of packet 110f, the root 12b of the dominant aggregation group 14b filters the group-specific path addresses 46e and 122b from the slots 120b and 120c in step 94, and inserts its corresponding root address 122c into slot 120b as the summary route information for the dominant aggregation group 14b.

Hence, the clusterhead 12a receives from the root 12b of the dominant aggregation group 14b the data packet 110g having a reverse routing header 104 that needs to specify only the summary route information 122c and the original source address 108.

Figure 7:
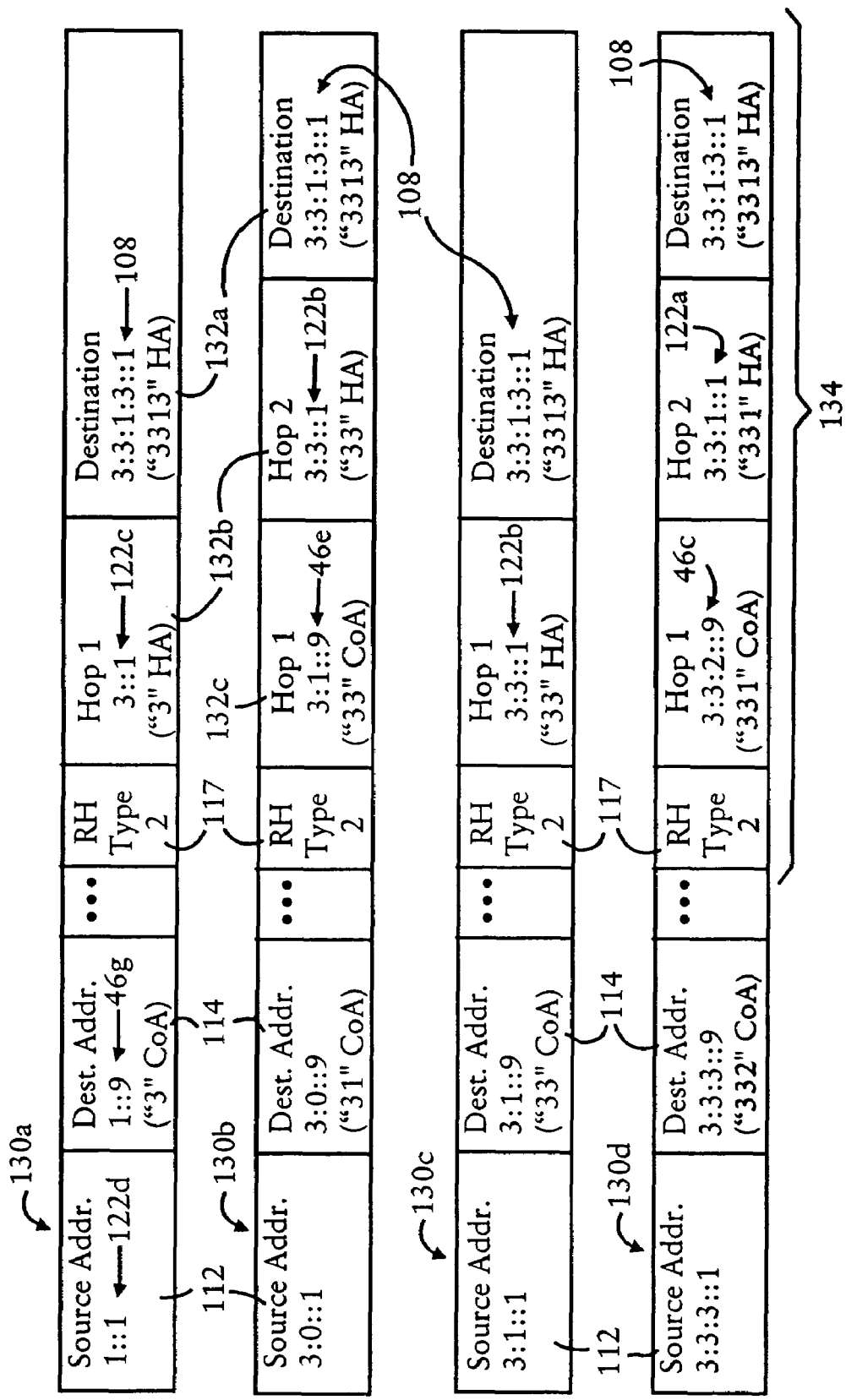
FIG. 7 is a diagram illustrating insertion of group-specific path information for a source-route header of a packet received from a clusterhead, according to another embodiment of the present invention.

FIG. 7 is a diagram illustrating expansion of a source routing path 134 for a data packet 130 received from an attachment router, according to an embodiment of the present invention. In particular, the data packet 130a is output by the network clusterhead 12a and specifies a source address field 112 of "1::1", which is the root address 122d utilized by the network clusterhead 12a as the root of the dominant aggregation group 14a. The destination address field 114 specifies the attachment address 46g of the mobile router 12b, and the option fields 132a and 132b for the routing header 134 specify the final destination address 108 and the first hop address, namely the summary route information 122c which is the root address for the root 12b. The routing header 134 also includes the routing header type 117, indicating that the header is a source routing header.

In response to the mobile router 12b receiving the data packet 130a, the routing resource 22 of the mobile router 12b identifies the source route type 117 and its root address 122c: the routing resource 22 responds to the root address 122c by inserting, according to step 96 of FIG. 4B, the path within the identified aggregation group for reaching the destination address 108, namely the attachment address 46e and the root address 122b in the source-route fields 132b and 132c. The mobile router 12b outputs the updated source-route packet 130b to the mobile router "31" 12, which outputs the packet 130c to the mobile router 12e.

The mobile router 12e, in response to detecting the routing header type field 117 and its root address 122b within the routing header 134, expands the source routing information 134 by inserting into packet 130d the group-specific path information for reaching the destination address 108, namely the attachment address 46c and the root address 122a. As apparent from the foregoing, the process of expanding the path is repeated by the mobile router 12f in response to detecting its root address 122a in the routing header 134, enabling the data packet to be source routed through the aggregation group 14f to the final destination router "3313" 12 at the destination address 108.

According to the disclosed embodiment, mobile ad hoc network nodes aggregate into aggregation groups based on assigned hierarchy positions with identified aggregation groups, enabling the mobile ad hoc network to form as a tree-based structure of dominant aggregation groups, each dominant aggregation group enclosing subordinate aggregation groups. Each aggregation group has a corresponding root, enabling group-specific routing information to be removed from packets destined for the clusterhead, and inserted into packets received by the root and destined into the aggregation group. Hence, mobile ad hoc networks can organize and maintain routing information in a scalable manner.

Figure 8:
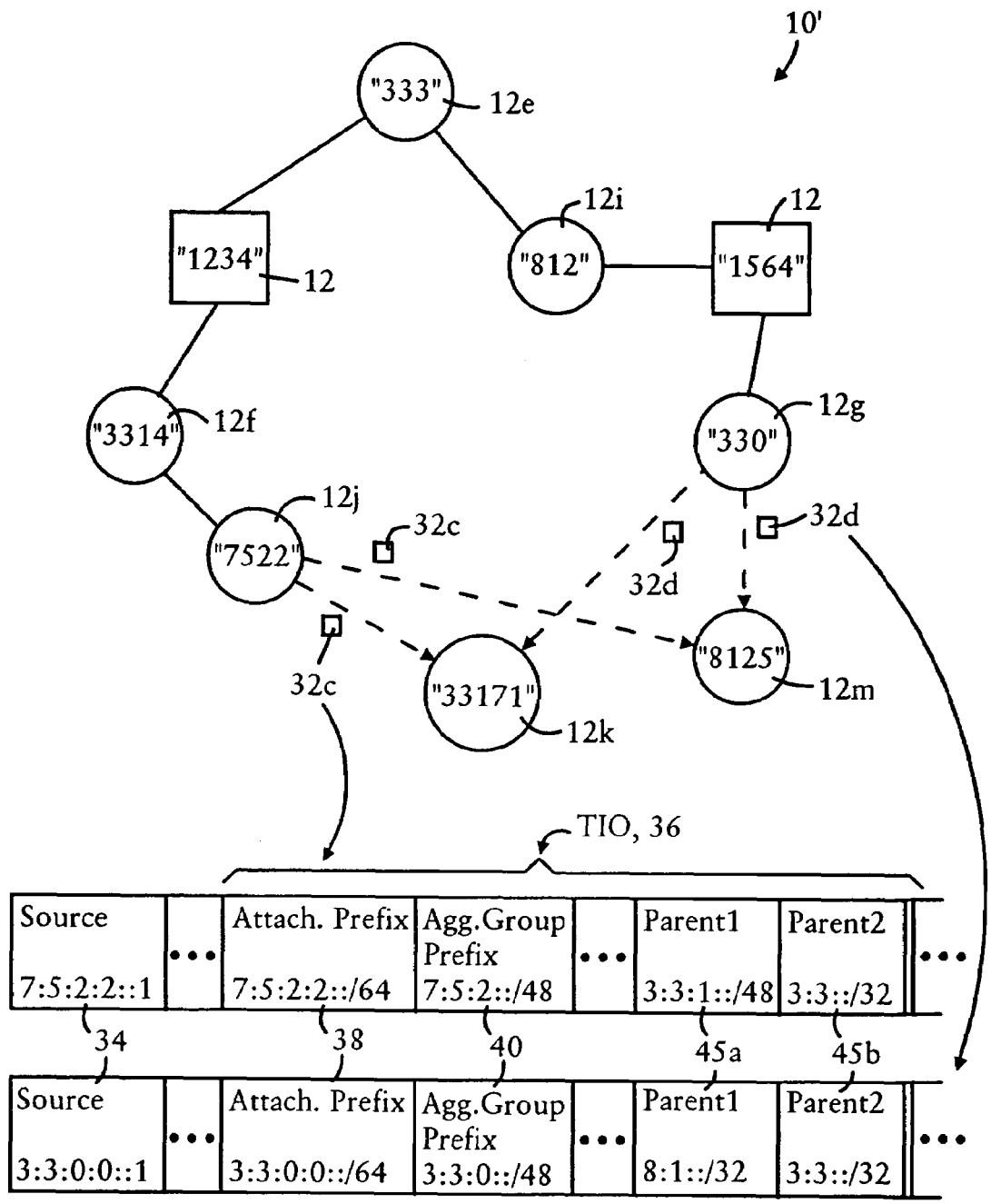
FIG. 8 is a diagram illustrating selective attachment of mobile ad hoc routers as root nodes of respective aggregation groups within a tree-based mobile ad hoc network based on determining a best match from advertised hierarchy positions, according to an embodiment of the present invention.

FIG. 8 is a diagram further illustrating the selective attachment of mobile routers in an ad hoc mobile network 10' based on identifying a best match within the identifiable positions of identifiable aggregation groups. The network 10' illustrates an initial formation of an ad hoc mobile network, or alternatively a reconstruction of the network following a substantial disruption. In particular, the mobile router 12e of FIG. 1 is detached from the parent "31" illustrated in FIG. 1, and is configured for serving as a clusterhead based on the determined absence of any other mobile router within its aggregation group 14b. Assume the mobile routers 12e, 12f, 12g, 12i, 12j, 12k, and 12m are configured for serving as roots (i.e., aggregators) for respective aggregation groups, and the mobile routers "1234" and "1564" 12 are not configured for serving as roots, and therefore cannot perform any aggregation.

The mobile router 12e outputs a router advertisement message (not shown) that specifies the corresponding attachment prefix 38 of "3:3:3::/64", the aggregation group prefix 40 of "3:3::/32", and that it is roaming (hence no parent identifier field 45). The mobile routers "1234" 12 and "812" 12i each attach to the mobile router 12e, and in response the mobile router "1234" 12 advertises its corresponding attachment prefix 38 of "1:2:3:4::/64" and the aggregation group prefix 40 of "3:3::/32" that is advertised by the mobile router 12e; in contrast, the mobile router 12i, as an aggregator of the aggregation group "8:1::/32", advertises its corresponding attachment prefix 38 of "8:1:2::/64" and the aggregation group prefix 40 of "8:1::/32", and adds a parent group identifier field 45 of "3:3::/32" as advertised by the mobile router 12e.

Regarding the subtree (i.e., descendents) of the mobile router 12i, since the mobile router "1564" 12 is not configured to serve as a root (i.e., aggregator), it continues to advertise the same aggregation group prefix 40 of "8:1::/32" advertised by its attachment router 12*i*. The mobile router "330" 12*g*, however, is configured to serve as an aggregator of its own aggregation group, and therefore outputs the router advertisement message 32*d* that specifies its corresponding attachment prefix 38 of "3:3:0:0::/64", its corresponding aggregation group prefix 40 of "3:3:0:0::/48", the parent prefix 45*a* of "8:1::/32" for the next aggregator 12*i*, and the parent prefix 45*b* of "3:3::/32" for the next aggregator 12*e*. Hence, the router advertisement message 32*d* specifies all the identifiable aggregation groups and their respective positions in the hierarchy between the advertising mobile router 12*g* and the clusterhead 12*e*.

Similarly, the mobile routers 12*f* and 12*j*, both configured as aggregators, advertise their own respective aggregation group prefixes based on attachment to the parent aggregation group prefix "3:3::/32". Hence, the mobile router 12*f* advertises the corresponding aggregation group prefix 40 "3:3:1::/48" and the parent prefix 45 of "3:3::132", and the mobile router 12*j* outputs the router advertisement message 32*c* specifying the corresponding aggregation group prefix 40 of "7:5:2::/48", and the parent prefixes 45*a* and 45*b* of 3:3:1::/48 and "3:3::/32", respectively.

Assume that the ad hoc mobile routers 12*k* and 12*m* are roaming and determining whether to attach to the mobile routers 12*g* or 12*j* based on the respective advertisement messages 32*d* and 32*c*. Mobile router 12*k* is configured for serving as a root for the aggregation group prefix "3:3:1:7::/64" (e.g., with a smaller assigned prefix of "3:3:1:7:1::/96"), and the mobile router 12*m* is configured for serving as a root for the aggregation group prefix "8:1:2::/48". Since no longest matching prefix is available to either mobile router 12*k* or 12*m* via the advertising routers 12*g* or 12*j*, each mobile router 12*k* and 12*m* needs to identify either a best match from the advertised parent prefixes 45*a* and 45*b* of either message 32*c* or 32*d*, or at least the presence of any shared attribute (e.g., a shared prefix) to at least begin migration toward the appropriate aggregation group.

In the case of the mobile router 12*k* configured for serving as the root for the aggregation group prefix "3:3:1:7::/64", the attachment resource 18 of mobile router 12*k* may determine that even though the aggregation group prefix 40 of "7:5:2::/48" advertised by the mobile router 12*j* in the message 32*c* does not have any shared attribute with the assigned aggregation prefix "3:3:1:7::/64", the parent prefix 45*a* of "3:3:1::/48" in the message 32*c* does provide a longest matching prefix for the assigned prefix "3:3:1:7::/64", relative to all the received messages 32*c* and 32*d*. Hence, the attachment resource 18 of mobile router 12*k* will choose to attach to the mobile router 12*j* in order to enable the mobile router 12*f* to aggregate the prefix "3:3:1:7::/64" within its aggregation group 14*f* of "3:3:1::/48".

In the case of the mobile router 12*m* configured for serving as the root for the aggregation group prefix "8:1:2::/48", the corresponding attachment resource 18 of mobile router 12*m* will detect no shared attributes within the router advertisement message 32*c*. However, the attachment resource 18 of mobile router 12*m* will detect the parent prefix 45*a* of message 32*d* specifying "8:1::/32" which is a best match for the assigned "8:1:2::/48", as the mobile router 12*i* can perform aggregation of the prefix "8:1:2::/48" within the aggregation group "8:1::/32". Hence, the mobile router 12*m* will attach to the mobile router 12*g* to enable aggregation by the mobile router 12*i*.

As apparent from the foregoing, each of the mobile routers of FIG. 8 may eventually attach to another mobile router that provides a better match for the corresponding assigned hierarchy position within the aggregation group, until the mobile routers eventually coalesce with each other to form an organized hierarchy similar to the network 10 of FIG. 1.

According to the disclosed embodiment, mobile routers identify a best match for attachment within aggregation groups in a tree-structured network topology, enabling the mobile routers to create an ad hoc mobile network of a tree of aggregation groups. The tree of aggregation groups enables scalable routing protocols to be employed based on removing group-specific routing information from messages destined toward the clusterhead.

Although the disclosed embodiment describes aggregation groups in terms of network prefixes, it will be readily apparent that other identifiable parameters may be used to identified aggregation groups and hierarchy positions, for example organizational attributes, topological attributes, class/ranking attributes, domain name attributes, etc. In each case, however, each mobile router is permitted to attach to a visited aggregation group if its own aggregation group is not available.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a mobile ad hoc router, the method including:
   receiving router advertisement messages, each including a source address field identifying a corresponding available mobile ad hoc router having sent the corresponding router advertisement message, and a tree information option field having attributes describing a corresponding position of the corresponding available mobile ad hoc router within a tree-structured network topology, the attributes including:
   (1) an identifiable aggregation group identifying a corresponding aggregation of attached mobile ad hoc routers forming a subset of the tree-structured network topology, the aggregation including the corresponding available mobile ad hoc router, and
   (2) an identifiable hierarchy position of the corresponding available mobile ad hoc router within the identifiable aggregation group; and
   selectively attaching to one of the available mobile ad hoc routers based on determining the one available mobile ad hoc router provides a best match, relative to the mobile ad hoc router having an assigned hierarchy position within an identified aggregation group, from among the identifiable hierarchy positions of identifiable aggregation groups.

2. The method of claim 1, wherein the determining includes identifying the one available mobile ad hoc router as specifying, as the identifiable aggregation group, one of the identified aggregation group a second aggregation containing the identified aggregation group.

3. The method of claim 2, further comprising outputting a new advertisement message specifying in the corresponding identifiable hierarchy position that the mobile ad hoc router is a root of the identified aggregation group within the second aggregation, based on:
   the assigned hierarchy position identifying the mobile ad hoc router as an eligible root of the identified aggregation group;
   the mobile ad hoc router having attached to the one available mobile ad hoc router having specified the second aggregation as the identifiable aggregation group, the second aggregation identifying an attachment group for the identified aggregation group; and a determined absence, among the identifiable hierarchy positions of identifiable aggregation groups, of an identifiable root for the identified aggregation group.

4. The method of claim 1, further comprising second selectively attaching to any one of the available mobile ad hoc routers based on a determined absence of any shared aggregation attribute between the identified aggregation group of the mobile ad hoc router and any of the identifiable aggregation groups.

5. The method of claim 1, further comprising:

attaching to the one available mobile ad hoc router as a root of the identified aggregation group based on the one available mobile ad hoc router specifying the corresponding identifiable aggregation group as an attachment group for the identified aggregation group;

receiving, from an attached mobile ad hoc router in the identified aggregation group, a first packet destined for the one available mobile ad hoc router and specifying routing information that includes group-specific routing information related to the identified aggregation group;

generating a filtered packet having filtered routing information based on replacing the group-specific routing information with summary routing information identifying the mobile ad hoc router; and outputting the filtered packet to the one available mobile ad hoc router.

6. The method of claim 5, wherein:

the routing information in the first packet specifies reachable network prefixes that are reachable via the attached mobile ad hoc router, the group-specific routing information including the reachable network prefixes within the identified aggregation group having a shared aggregation attribute relative to a network prefix used by the mobile ad hoc router;

the generating including replacing the group-specific routing information with the summary routing information, the summary routing information based on the shared aggregation attribute, and passing any of the reachable network prefixes that do not have the shared aggregation attribute.

7. The method of claim 6, further comprising:

storing the routing information from the first packet into a routing table;

receiving from the one available mobile ad hoc router a packet having a destination address that specifies the mobile ad hoc router, and a source routing header that specifies an address identifiable as having a determined presence in the identified aggregation group, and inserting into the source routing header a path within the identified aggregation group for reaching the single address, based on retrieving the path from the routing information stored in the routing table.

8. The method of claim 5, wherein:

the routing information in the first packet specifies a reverse routing header, the group-specific routing information including a plurality of path addresses within the identified aggregation group for reaching an identified source of the first packet;

the generating including removing the path addresses within the identified aggregation group from the reverse routing header, the summary routing information identifying a network address of the mobile ad hoc router;

the outputting including outputting the filtered packet, having a revised reverse routing header following the removal of the path addresses and insertion of the network address of the mobile ad hoc router.

9. The method of claim 8, further comprising:

receiving from the one available mobile ad hoc router a packet having a destination address that specifies the mobile ad hoc router, and a source routing header that specifies an address identifiable as having a determined presence in the identified aggregation group, and inserting into the source routing header a path within the identified aggregation group for reaching the single address.

10. The method of claim 5, further comprising:

receiving from the one available mobile ad hoc router a packet having a destination address that specifies the mobile ad hoc router, and a source routing header that specifies an address identifiable as having a determined presence in the identified aggregation group, and inserting into the source routing header a path within the identified aggregation group for reaching the single address.

11. The method of claim 1, wherein the selectively attaching includes attaching only to any of the available mobile ad hoc routers having advertised as a root node for a corresponding distinct dominant aggregation group, based on:

the mobile ad hoc router having at least one other attached mobile ad hoc router; and the assigned hierarchy position within the identified aggregation group identifying the mobile ad hoc router as the root for a corresponding prescribed dominant aggregation group.

12. The method of claim 1, wherein the selectively attaching includes determining the one available mobile ad hoc router as providing a best match based on at least one of: (1) the corresponding identifiable hierarchy position within the corresponding identifiable aggregation group specifying a longest matching network address prefix relative to the assigned hierarchy position within the identified aggregation group; or (2) the corresponding tree information option field identifying membership of the corresponding identifiable aggregation group within a parent aggregation group of the tree-structured network topology.

13. A mobile ad hoc network comprising:

a plurality of mobile ad hoc routers, each including:

(1) an assigned hierarchy position within an identified aggregation group, (2) a network interface configured for sending and receiving router advertisement messages, each router advertisement message specifying a source address field identifying a corresponding available mobile ad hoc router, and a tree information option field having attributes describing an identifiable aggregation group for the corresponding available mobile ad hoc router within a corresponding subset of a tree-structured network topology of the mobile ad hoc network, and an identifiable hierarchy position of the corresponding available mobile ad hoc router within the identifiable aggregation group, and (3) an attachment resource configured for selectively attaching to one of the available mobile ad hoc routers having been identified as providing a best match, for the assigned hierarchy position within the identified aggregation group, among the identifiable hierarchy positions of identifiable aggregation groups;

the mobile ad hoc routers forming the tree-structured network topology as a tree of aggregation groups, each aggregation group including a single corresponding root, each mobile ad hoc router operating as a root configured for outputting filtered routing information toward one of mobile ad hoc routers identified as a network clusterhead.

14. The network of claim 13, wherein the attachment resource of each mobile ad hoc router is configured for selectively attaching to any one of the available mobile ad hoc routers based on a determined absence of any shared aggregation attribute between the corresponding identified aggregation group of the corresponding mobile ad hoc router and any of the identifiable aggregation groups.

15. The network of claim 13, wherein:
each mobile ad hoc router operating as the root of a corresponding aggregation group is configured for filtering a received first packet, received from an attached mobile ad hoc router in the corresponding aggregation group and destined toward the clusterhead, based on the first packet specifying routing information that includes group-specific routing information related to the corresponding aggregation group;
said each mobile ad hoc router operating as a root configured for filtering the received first packet based on replacing the group-specific routing information with summary routing information identifying the root of the corresponding aggregation group, and outputting the filtered packet toward the clusterhead.

16. The network of claim 15, wherein:
the routing information in the first packet specifies reachable network prefixes that are reachable via the attached mobile ad hoc router, the group-specific routing information including the reachable network prefixes within the corresponding aggregation group having a shared aggregation attribute relative to a network prefix used by said each mobile ad hoc router operating as a root;
said each mobile ad hoc router operating as a root configured for replacing the group-specific routing information with the summary routing information, the summary routing information based on the shared aggregation attribute, and passing any of the reachable network prefixes that do not have the shared aggregation attribute.

17. The network of claim 16, wherein each mobile ad hoc router includes a routing table, said each mobile ad hoc router operating as a root further is configured for:
storing the routing information from the first packet into a routing table;
receiving from a corresponding attachment mobile ad hoc router a packet having a destination address that specifies the mobile ad hoc router, and a source routing header that specifies an address identifiable as having a determined presence in the corresponding aggregation group, and
inserting into the source routing header a path within the corresponding aggregation group for reaching the single address, based on retrieving the path from the routing information stored in the routing table.

18. The network of claim 15, wherein:
the routing information in the first packet specifies a reverse routing header, the group-specific routing information including a plurality of path addresses within the corresponding aggregation group for reaching an identified source of the first packet;
said each mobile ad hoc router operating as a root further is configured for removing the path addresses within the corresponding aggregation group from the reverse routing header, the summary routing information identifying a network address of said each mobile ad hoc router operating as a root;
said each mobile ad hoc router operating as a root configured for outputting toward the network clusterhead the filtered packet, having a revised reverse routing header following the removal of the path addresses and insertion of the network address of said each mobile ad hoc router operating as a root.

19. The network of claim 18, wherein said each mobile ad hoc router operating as a root is configured for:
receiving from an attachment mobile ad hoc router a packet having a destination address that specifies said each mobile ad hoc router operating as a root, and a source routing header that specifies an address identifiable as having a determined presence in the corresponding aggregation group, and
inserting into the source routing header a path within the corresponding aggregation group for reaching the single address.

20. The network of claim 15, wherein said each mobile ad hoc router operating as a root is configured for:
receiving from an attachment mobile ad hoc router a packet having a destination address that specifies said each mobile ad hoc router operating as a root, and a source routing header that specifies an address identifiable as having a determined presence in the corresponding aggregation group, and
inserting into the source routing header a path within the corresponding aggregation group for reaching the single address.

21. The network of claim 13, wherein each mobile ad hoc router, in response to detecting the corresponding assigned hierarchy position specifying root authority for a prescribed dominant aggregation group, is configured for:
operating as the root for the corresponding prescribed dominant aggregation group; and
attaching only to available mobile ad hoc routers having advertised as a root node for a corresponding distinct dominant aggregation group.

22. The network of claim 13, wherein the attachment resource is configured for determining the best match based on at least one of: (1) the corresponding identifiable hierarchy position within the corresponding identifiable aggregation group specifying a longest matching network address prefix relative to the assigned hierarchy position within the identified aggregation group; (2) the corresponding tree information option field identifying membership of the corresponding identifiable aggregation group within a parent aggregation group of the tree-structured network topology.

23. A computer readable medium having stored thereon sequences of instructions for a mobile ad hoc router to attach to another mobile ad hoc router, the sequences of instructions including instructions for:
receiving router advertisement messages, each including a source address field identifying a corresponding available mobile ad hoc router having sent the corresponding router advertisement message, and a tree information option field having attributes describing a corresponding position of the corresponding available mobile ad hoc router within a tree-structured network topology, the attributes including:
(1) an identifiable aggregation group identifying a corresponding aggregation of attached mobile ad hoc routers forming a subset of the tree-structured network topology, the aggregation including the corresponding available mobile ad hoc router, and
(2) an identifiable hierarchy position of the corresponding available mobile ad hoc router within the identifiable aggregation group; and selectively attaching to one of the available mobile ad hoc routers based on determining the one available mobile ad hoc router provides a best match, relative to the mobile ad hoc router having an assigned hierarchy position within an identified aggregation group, from among the identifiable hierarchy positions of identifiable aggregation groups.

24. The medium of claim 23, wherein the determining includes identifying the one available mobile ad hoc router as specifying, as the identifiable aggregation group, one of the identified aggregation group or a second aggregation containing the identified aggregation group.

25. The medium of claim 24, further comprising instructions for outputting a new advertisement message specifying in the corresponding identifiable hierarchy position that the mobile ad hoc router is a root of the identified aggregation group within the second aggregation, based on:
the assigned hierarchy position identifying the mobile ad hoc router as an eligible root of the identified aggregation group;
the mobile ad hoc router having attached to the one available mobile ad hoc router having specified the second aggregation as the identifiable aggregation group, the second aggregation identifying an attachment group for the identified aggregation group; and
a determined absence, among the identifiable hierarchy positions of identifiable aggregation groups, of an identifiable root for the identified aggregation group.

26. The medium of claim 23, further comprising instructions for second selectively attaching to any one of the available mobile ad hoc routers based on a determined absence of any shared aggregation attribute between the identified aggregation group of the mobile ad hoc router and any of the identifiable aggregation groups.

27. The medium of claim 23, further comprising instructions for:
attaching to the one available mobile ad hoc router as a root of the identified aggregation group based on the one available mobile ad hoc router specifying the corresponding identifiable aggregation group as an attachment group for the identified aggregation group;
receiving, from an attached mobile ad hoc router in the identified aggregation group, a first packet destined for the one available mobile ad hoc router and specifying routing information that includes group-specific routing information related to the identified aggregation group;
generating a filtered packet having filtered routing information based on replacing the group-specific routing information with summary routing information identifying the mobile ad hoc router; and
outputting the filtered packet to the one available mobile ad hoc router.

28. The medium of claim 27, wherein:
the routing information in the first packet specifies reachable network prefixes that are reachable via the attached mobile ad hoc router, the group-specific routing information including the reachable network prefixes within the identified aggregation group having a shared aggregation attribute relative to a network prefix used by the mobile ad hoc router;
the generating including replacing the group-specific routing information with the summary routing information, the summary routing information based on the shared aggregation attribute, and passing any of the reachable network prefixes that do not have the shared aggregation attribute.

29. The medium of claim 28, further comprising instructions for:
storing the routing information from the first packet into a routing table;
receiving from the one available mobile ad hoc router a packet having a destination address that specifies the mobile ad hoc router, and a source routing header that specifies an address identifiable as having a determined presence in the identified aggregation group, and
inserting into the source routing header a path within the identified aggregation group for reaching the single address, based on retrieving the path from the routing information stored in the routing table.

30. The medium of claim 27, wherein:
the routing information in the first packet specifies a reverse routing header, the group-specific routing information including a plurality of path addresses within the identified aggregation group for reaching an identified source of the first packet;
the generating including removing the path addresses within the identified aggregation group from the reverse routing header, the summary routing information identifying a network address of the mobile ad hoc router;
the outputting including outputting the filtered packet, having a revised reverse routing header following the removal of the path addresses and insertion of the network address of the mobile ad hoc router.

31. The medium of claim 30, further comprising instructions for:
receiving from the one available mobile ad hoc router a packet having a destination address that specifies the mobile ad hoc router, and a source routing header that specifies an address identifiable as having a determined presence in the identified aggregation group, and
inserting into the source routing header a path within the identified aggregation group for reaching the single address.

32. The medium of claim 27, further comprising instructions for:
receiving from the one available mobile ad hoc router a packet having a destination address that specifies the mobile ad hoc router, and a source routing header that specifies an address identifiable as having a determined presence in the identified aggregation group, and
inserting into the source routing header a path within the identified aggregation group for reaching the single address.

33. The medium of claim 23, wherein the selectively attaching includes attaching only to any of the available mobile ad hoc routers having advertised as a root node for a corresponding distinct dominant aggregation group, based on:
the mobile ad hoc router having at least one other attached mobile ad hoc router; and
the assigned hierarchy position within the identified aggregation group identifying the mobile ad hoc router as the root for a corresponding prescribed dominant aggregation group.

34. The medium of claim 23, wherein the selectively attaching includes determining the one available mobile ad hoc router as providing a best match based on at least one of: (1) the corresponding identifiable hierarchy position within the corresponding identifiable aggregation group specifying a longest matching network address prefix relative to the assigned hierarchy position within the identified aggregation group; or (2) the corresponding tree information option field identifying membership of the corresponding identifiable aggregation group within a parent aggregation group of the tree-structured network topology.

35. A mobile ad hoc router comprising:
a network interface configured for receiving router advertisement messages, each including a source address field identifying a corresponding available mobile ad hoc router having sent the corresponding router advertisement message, and a tree information option field having attributes describing a corresponding position of the corresponding available mobile ad hoc router within a tree-structured network topology, the attributes including:
(1) an identifiable aggregation group identifying a corresponding aggregation of attached mobile ad hoc routers forming a subset of the tree-structured network topology, the aggregation including the corresponding available mobile ad hoc router, and
(2) an identifiable hierarchy position of the corresponding available mobile ad hoc router within the identifiable aggregation group;
a memory configured for storing an assigned hierarchy position within an identified aggregation group; and
an attachment resource configured for selectively attaching to one of the available mobile ad hoc routers based on determining the one available mobile ad hoc router provides a best match, relative to the assigned hierarchy position within the identified aggregation group, from among the identifiable hierarchy positions of identifiable aggregation groups.

36. The router of claim 35, wherein the attachment resource is configured for identifying the one available mobile ad hoc router as specifying, as the identifiable aggregation group, one of the identified aggregation group a second aggregation containing the identified aggregation group.

37. The router of claim 36, further comprising an advertisement resource configured for outputting a new advertisement message specifying in the corresponding identifiable hierarchy position that the mobile ad hoc router is a root of the identified aggregation group within the second aggregation, based on:
the assigned hierarchy position identifying the mobile ad hoc router as an eligible root of the identified aggregation group;
the attachment resource having attached to the one available mobile ad hoc router having specified the second aggregation as the identifiable aggregation group, the second aggregation identifying an attachment group for the identified aggregation group; and
the attachment resource having determined an absence, among the identifiable hierarchy positions of identifiable aggregation groups, of an identifiable root for the identified aggregation group.

38. The router of claim 35, wherein the attachment resource is configured for selectively attaching to any one of the available mobile ad hoc routers based on a determined absence of any shared aggregation attribute between the identified aggregation group of the mobile ad hoc router and any of the identifiable aggregation groups.

39. The router of claim 35, wherein:
the attachment resource is configured for attaching to the one available mobile ad hoc router as a root of the identified aggregation group based on the one available mobile ad hoc router specifying the corresponding identifiable aggregation group as an attachment group for the identified aggregation group;
the network interface configured for receiving, from an attached mobile ad hoc router in the identified aggregation group, a first packet destined for the one available mobile ad hoc router and specifying routing information that includes group-specific routing information related to the identified aggregation group;
the mobile ad hoc router further comprising a routing resource configured for generating a filtered packet having filtered routing information based on replacing the group-specific routing information with summary routing information identifying the mobile ad hoc router, the routing resource configured for causing the network interface to output the filtered packet to the one available mobile ad hoc router.

40. The router of claim 39, wherein:
the routing information in the first packet specifies reachable network prefixes that are reachable via the attached mobile ad hoc router, the group-specific routing information including the reachable network prefixes within the identified aggregation group having a shared aggregation attribute relative to a network prefix used by the mobile ad hoc router;
the routing resource configured for replacing the group-specific routing information with the summary routing information, the summary routing information based on the shared aggregation attribute, the routing resource further configured for passing any of the reachable network prefixes that do not have the shared aggregation attribute.

41. The router of claim 40, further comprising:
a routing table configured for storing the routing information from the first packet;
the network interface configured for receiving from the one available mobile ad hoc router a packet having a destination address that specifies the mobile ad hoc router, and a source routing header that specifies an address identifiable as having a determined presence in the identified aggregation group,
the routing resource configured for inserting into the source routing header a path within the identified aggregation group for reaching the single address, based on retrieving the path from the routing information stored in the routing table.

42. The router of claim 39, wherein:
the routing information in the first packet specifies a reverse routing header, the group-specific routing information including a plurality of path addresses within the identified aggregation group for reaching an identified source of the first packet;
the routing resource configured for removing the path addresses within the identified aggregation group from the reverse routing header, the summary routing information identifying a network address of the mobile ad hoc router;
the routing resource configured for outputting the filtered packet, having a revised reverse routing header following the removal of the path addresses and insertion of the network address of the mobile ad hoc router.

43. The router of claim 42, wherein:
the network interface is configured for receiving from the one available mobile ad hoc router a packet having a destination address that specifies the mobile ad hoc router, and a source routing header that specifies an address identifiable as having a determined presence in the identified aggregation group,
the routing resource configured for inserting into the source routing header a path within the identified aggregation group for reaching the single address.

44. The router of claim 39, wherein:
- the network interface is configured for receiving from the one available mobile ad hoc router a packet having a destination address that specifies the mobile ad hoc router, and a source routing header that specifies an address identifiable as having a determined presence in the identified aggregation group,
- the routing resource configured for inserting into the source routing header a path within the identified aggregation group for reaching the single address.

45. The router of claim 35, wherein the attachment resource is configured for attaching only to any of the available mobile ad hoc routers having advertised as a root node for a corresponding distinct dominant aggregation group, based on:
- the mobile ad hoc router having at least one other attached mobile ad hoc router; and
- the assigned hierarchy position within the identified aggregation group identifying the mobile ad hoc router as the root for a corresponding prescribed dominant aggregation group.

46. The router of claim 35, wherein the attachment resource is configured for determining the one available mobile ad hoc router as providing a best match based on at least one of: (1) the corresponding identifiable hierarchy position within the corresponding identifiable aggregation group specifying a longest matching network address prefix relative to the assigned hierarchy position within the identified aggregation group; (2) the corresponding tree information option field identifying membership of the corresponding identifiable aggregation group within a parent aggregation group of the tree-structured network topology.

47. A mobile ad hoc router comprising:
- means for receiving router advertisement messages, each including a source address field identifying a corresponding available mobile ad hoc router having sent the corresponding router advertisement message, and a tree information option field having attributes describing a corresponding position of the corresponding available mobile ad hoc router within a tree-structured network topology, the attributes including:
  - (1) an identifiable aggregation group identifying a corresponding aggregation of attached mobile ad hoc routers forming a subset of the tree-structured network topology, the aggregation including the corresponding available mobile ad hoc router, and
  - (2) an identifiable hierarchy position of the corresponding available mobile ad hoc router within the identifiable aggregation group;
- means for storing an assigned hierarchy position within an identified aggregation group; and
- means for selectively attaching to one of the available mobile ad hoc routers based on determining the one available mobile ad hoc router provides a best match, relative to the assigned hierarchy position within the identified aggregation group, from among the identifiable hierarchy positions of identifiable aggregation groups.

* * * * *